US012570248B2

(12) United States Patent
Siddarahally Vajrachari et al.

(10) Patent No.: US 12,570,248 B2
(45) Date of Patent: Mar. 10, 2026

(54) BRAKE COOLING ASSEMBLY

(71) Applicant: Honeywell International Inc., Charlotte, NC (US)

(72) Inventors: Prashantha Siddarahally Vajrachari, Bengaluru (IN); Devraj Dash, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 515 days.

(21) Appl. No.: 18/165,746

(22) Filed: Feb. 7, 2023

(65) Prior Publication Data

US 2024/0190396 A1 Jun. 13, 2024

(30) Foreign Application Priority Data

Dec. 9, 2022 (IN) .............................. 202211071188

(51) Int. Cl.
| | |
|---|---|
| *B60T 5/00* | (2006.01) |
| *B60L 50/70* | (2019.01) |
| *B64C 25/42* | (2006.01) |
| *B64D 13/06* | (2006.01) |
| *B64D 27/34* | (2024.01) |

(Continued)

(52) U.S. Cl.
CPC ................ *B60T 5/00* (2013.01); *B60L 50/70* (2019.02); *B64C 25/42* (2013.01); *B64D 13/06* (2013.01); *H01M 8/04014* (2013.01); *H01M 8/04097* (2013.01); *B60L 2200/10* (2013.01);
(Continued)

(58) Field of Classification Search
CPC ........ B60T 5/00; B60L 50/70; B60L 2200/10;
B64C 25/42; B64D 13/06; B64D 27/24;
B64D 2013/0603; B64D 27/34; H01M
8/04014; H01M 8/04097; H01M 2250/20
See application file for complete search history.

(56) References Cited

U.S. PATENT DOCUMENTS

| | | |
|---|---|---|
| 8,678,004 B2 | 3/2014 | Boussignac |
| 2014/0345991 A1 | 11/2014 | Zywiak et al. |

(Continued)

FOREIGN PATENT DOCUMENTS

| | | |
|---|---|---|
| CN | 113500981 A | 10/2021 |
| EP | 3048050 A1 | 7/2016 |

(Continued)

OTHER PUBLICATIONS

British Patent No. GB 2521270 to Karan published on Jun. 17, 2015.*

(Continued)

*Primary Examiner* — Pamela Rodriguez
(74) *Attorney, Agent, or Firm* — Shumaker & Sieffert, P.A.

(57) ABSTRACT

In some examples, a cooling system defines a first flow path for a first gas stream and a second flow path for a second gas stream. The cooling system is configured to merge the first gas stream and the second gas stream to produce a mixed gas stream and provide the mixed gas stream to cool a brake assembly of a wheel. Control circuitry is configured to adjust a flow rate of the second gas stream based on a pressure and/or other flow parameter of the first gas stream. In examples, the control circuitry is configured to initiate and/or substantially cease cooling to the brake assembly based on a temperature signal indicative of a temperature of the brake assembly.

20 Claims, 7 Drawing Sheets

(51) Int. Cl.
    *H01M 8/04014*    (2016.01)
    *H01M 8/04089*    (2016.01)

(52) U.S. Cl.
    CPC ...... *B64D 2013/0603* (2013.01); *B64D 27/34* (2024.01); *H01M 2250/20* (2013.01)

(56) References Cited

U.S. PATENT DOCUMENTS

| | | |
|---|---|---|
| 2016/0200446 A1 | 7/2016 | Sharma |
| 2019/0112037 A1 | 4/2019 | Meinel Cheesman |
| 2019/0301554 A1 | 10/2019 | Hosamane et al. |
| 2021/0239173 A1* | 8/2021 | Kirkbride ............. F16D 65/853 |
| 2021/0387606 A1 | 12/2021 | Fontalbat et al. |
| 2022/0234727 A1 | 7/2022 | Klim et al. |

FOREIGN PATENT DOCUMENTS

| | | |
|---|---|---|
| EP | 3954922 A1 | 2/2022 |
| EP | 3995368 A1 | 5/2022 |

OTHER PUBLICATIONS

Extended Search Report from counterpart European Application No. 23210054.5 dated May 7, 2024, 5 pp.
Notice of Intent to Grant and Text Intended to Grant from counterpart European Application No. 23210054.5 dated May 20, 2025, 96 pp.

* cited by examiner

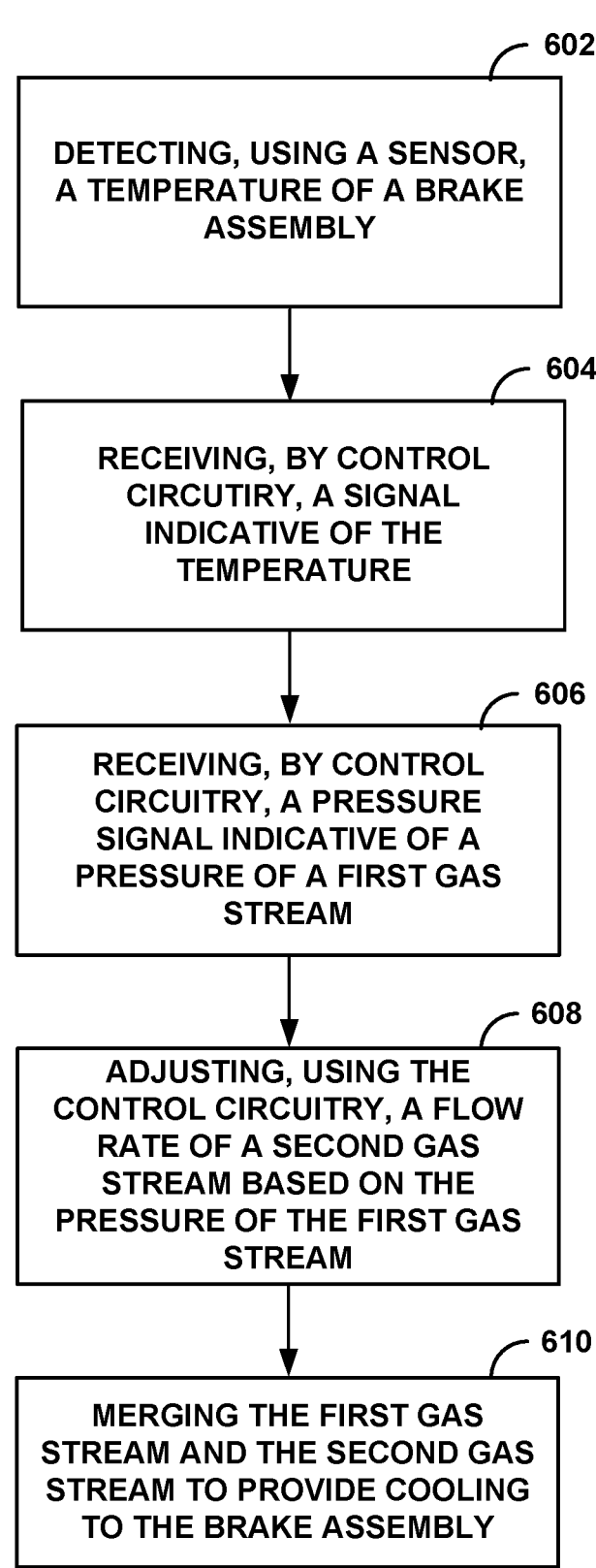

602

DETECTING, USING A SENSOR, A TEMPERATURE OF A BRAKE ASSEMBLY

604

RECEIVING, BY CONTROL CIRCUTIRY, A SIGNAL INDICATIVE OF THE TEMPERATURE

606

RECEIVING, BY CONTROL CIRCUITRY, A PRESSURE SIGNAL INDICATIVE OF A PRESSURE OF A FIRST GAS STREAM

608

ADJUSTING, USING THE CONTROL CIRCUITRY, A FLOW RATE OF A SECOND GAS STREAM BASED ON THE PRESSURE OF THE FIRST GAS STREAM

610

MERGING THE FIRST GAS STREAM AND THE SECOND GAS STREAM TO PROVIDE COOLING TO THE BRAKE ASSEMBLY

FIG. 6

BRAKE COOLING ASSEMBLY

This application claims the benefit of Indian Provisional Patent Application No. 202211071188, filed on Dec. 9, 2022, the entire contents of which is incorporated herein by reference.

TECHNICAL FIELD

The present disclosure relates to brake systems of a vehicle.

BACKGROUND

Vehicles, such as aircraft, may use a wheel brake assembly that includes a multi-disc brake assembly. For example, the multi-disc brake assembly may include a disc stack comprising plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel, the brake assembly may displace pistons against a pressure plate to compress the rotating rotor discs engaged with the wheel against the stationary stator discs, therefore producing torque that decelerates the rotational motion of the wheel. In some examples, the rotor discs may be engaged with the wheel via rotor drive keys positioned on an interior surface of the wheel. In some examples, stator discs may be engaged with a stationary torque tube surrounding the axle via splines positioned on the torque tube. In some such examples, the brake assembly may be configured to compress the rotor discs and the stator discs between the piston and a backing plate supported by the torque tube.

SUMMARY

The present disclosure describes articles, systems, and techniques relating to cooling one or more components of a brake assembly. In examples described herein, a cooling system is configured to merge a first gas stream and a second gas stream to produce a mixed gas stream. The cooling system is configured to provide the mixed gas stream to a brake assembly of a wheel. In examples, a first system on board a vehicle (e.g., a fuel cell onboard an aircraft) provides the first gas stream. In examples, a second system on board the vehicle (e.g., an environmental control system onboard the aircraft) provides the second gas stream. Control circuitry adjusts a flow rate of the second gas stream based on a pressure of the first gas stream to, for example, provide the mixed gas stream in a manner limiting and/or substantially preventing the second gas stream from adversely impacting the operation of the first system (e.g., the fuel cell) providing the first gas stream. In some examples, the control circuitry initiates and/or substantially ceases cooling to the brake assembly based on a temperature signal indicative of a temperature of the brake assembly.

In an example, a cooling system comprises: a first flow path defined by the cooling system and configured to discharge a first gas stream; a second flow path defined by the cooling system and configured to discharge a second gas stream; a flow junction configured to merge the first gas stream and the second gas stream and discharge a mixed gas stream to cool a brake assembly of a vehicle; a pressure sensor configured to provide a pressure signal indicative of a pressure of the first gas stream; a control valve configured to control a flow of the second gas stream; and control circuitry configured to: receive the pressure signal, and operate the control valve to adjust a flow of the second gas stream based on the pressure signal.

In an example, a cooling system comprises: a fuel cell configured to provide electrical power to a vehicle; a first conduit defining a first flow path and configured to discharge a first gas stream, wherein the first gas stream is at a least a portion of an exhaust stream discharged by the fuel cell; a second conduit defining a second flow path and configured to discharge a second gas stream; a flow junction configured to receive the first gas stream from the first conduit and receive the second gas stream from the second conduit, wherein the flow junction is configured to merge the first gas stream and the second gas stream and discharge a mixed gas stream to cool a brake assembly of the vehicle; a pressure sensor configured to provide a pressure signal indicative of a pressure of the first gas stream in the first conduit; a control valve configured to control a flow of the second gas stream in the second conduit; and control circuitry configured to: receive the pressure signal, and operate the control valve to adjust a flow of the second gas stream based on the pressure signal.

In an example, a technique comprises: receiving, by the control circuitry, a pressure signal indicative of a pressure of a first gas stream from a pressure sensor; operating, using the control circuitry, a control valve to adjust a flow of a second gas stream based on the pressure signal; merging, using a flow junction, the first gas stream and the second gas stream to produce a mixed gas stream; and discharging, using the flow junction, the mixed gas stream to cool a brake assembly of a vehicle.

The details of one or more examples are set forth in the accompanying drawings and the description below. Other features, objects, and advantages will be apparent from the description and drawings, and from the claims.

BRIEF DESCRIPTION OF DRAWINGS

FIG. 6 is a flow diagram illustrating an example method of cooling a brake assembly.

DETAILED DESCRIPTION

Figure 1:
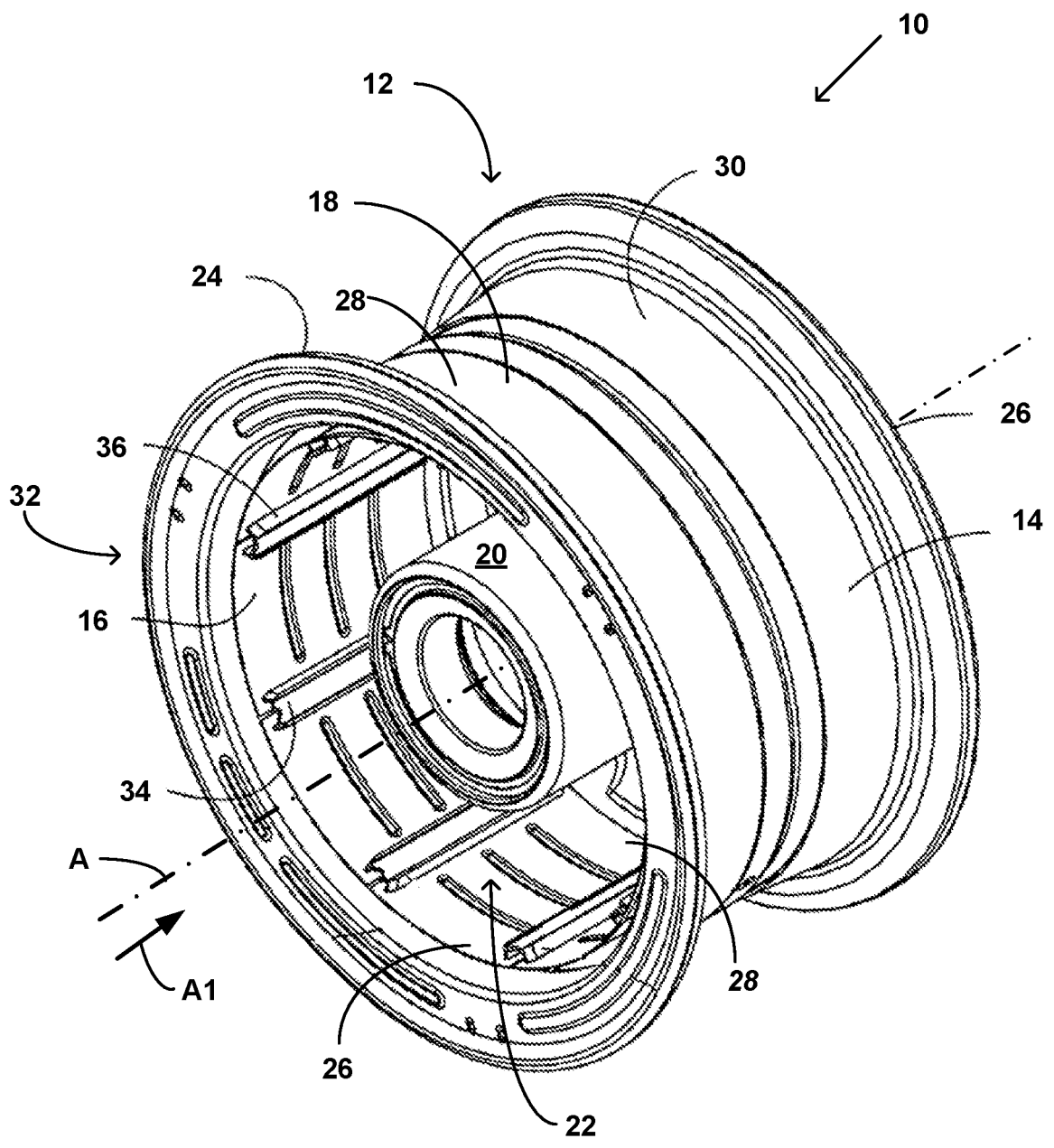
FIG. 1 is a perspective view illustrating an example wheel including a wheel cavity.

The disclosure describes articles, systems, and techniques relating to cooling an assembly comprising a wheel and a brake assembly. The wheel is configured to rotate around a wheel axis. The brake assembly may include a disc stack which includes one or more rotor discs and one or more stator discs. For example, the disc stack may include a plurality of rotor discs interleaved with a plurality of stator discs. The rotor discs are rotationally coupled with the wheel, such that a rotation of the wheel around the wheel axis causes rotation of the rotor discs around the wheel axis. The stator discs are configured to remain substantially stationary relative to the wheel and the rotor discs. The brake assembly is configured to compress the disc stack to cause engagement of friction surfaces on the rotating rotor discs and the stationary stator discs, reducing a rotational speed of the rotor discs around the wheel axis. The rotor discs are configured to engage the wheel, such that the reduction in the rotational speed of the rotor discs causes a reduction in the speed of the wheel.

Engaging the friction surfaces of the rotating rotor discs and stationary stator discs may cause an increase in temperature of the rotor discs, the stator discs, or other components of the brake assembly. In some cases (e.g., following an aircraft landing), it may be desirable to supply a cooling fluid to the disc stack or other portions of the brake assembly to reduce the temperature more quickly. Some wheel and brake assemblies require a separate cooling system (e.g., a system separate from an aircraft) to be set up and operated by a ground crew, in order to generally direct a flow of a cooling fluid over the brake assembly. The necessity for set up and subsequent operation of the separate cooling system by ground crew personnel may contribute to tarmac delays, negatively impacting the ability of an aircraft to accomplish a desired flight schedule and negatively impacting the efficiency of airport operations.

In examples described herein, a cooling system for a brake assembly of a vehicle includes a flow junction configured to merge a first gas stream and a second gas stream and direct the merged gas stream to the brake assembly to provide cooling to one or more components of the brake assembly. While the cooling system is described with reference to an aircraft, in other examples, the cooling system can be used with other vehicles, such as terrestrial vehicles, watercraft, and others. The cooling system is integrated with the aircraft (or other vehicle) and is not separately attached to the vehicle by a ground crew after a landing operation or other operation of an aircraft resulting in relatively high brake assembly temperatures. For example, in some examples, the cooling system is configured to remain in fluidic communication with the brake assembly as the brake assembly is translated (e.g., during the raising or lowering of the landing gear of an aircraft), such that the cooling system requires minimal or no set-up to provide cooling to the brake assembly when desired (e.g., following an aircraft landing). In examples, the cooling system is configured such that control circuitry and/or an operator within a vehicle (e.g., a pilot within an aircraft) may actuate the cooling system to initiate and/or substantially cease the flow of cooling fluid. Hence, the cooling system may be configured to allow an onboard control system and/or operator to initiate cooling of the brake assembly in a manner minimizing or eliminating the need for a ground crew to set-up and operate a separate cooling system.

The cooling system is configured to provide a first gas stream and a second gas stream to the flow junction. The flow junction is configured to merge the first gas stream and the second gas stream to provide a mixed gas stream to cool the brake assembly. In examples, the first gas stream is supplied by a first system, such as a first onboard system of the vehicle. The second gas stream may be supplied by a second system, such as a second onboard system of the vehicle. The cooling system is configured to control a flow of the second gas stream entering the flow junction based on a pressure signal indicative of a pressure of the first gas stream entering the flow junction to, for example, limit and/or substantially prevent the second gas stream from generating a significant back pressure on the first system providing the first gas stream. Hence, the cooling system may be configured to merge the first gas stream and the second gas stream in a manner limiting and/or substantially preventing the second gas stream from adversely impacting the operation of the first system providing the first gas stream.

In examples, the first system is a fuel cell (e.g., an onboard fuel cell) configured to provide electrical power to the vehicle. The first gas stream may be supplied by the fuel cell. For example, the first gas stream may be a gas stream in fluidic communication with a cathode side of the fuel cell. The cooling system may thus be configured to limit and/or substantially prevent the second gas stream from adversely impacting the pressure of the first gas stream in order to, for example, limit and/or substantially prevent adverse impacts to operations of the fuel cell. In examples, the first gas stream is provided from a cathode exhaust stream of a fuel cell. The fuel cell may be configured to receive an air flow into the cathode side and extract oxygen from the air flow, such that the cathode exhaust is a substantially nitrogen-enriched air (NEA).

In examples, the second system is an Environmental Control System (ECS) configured to provide air (e.g., conditioned air) to the vehicle (e.g., to the cabin of an aircraft). The second gas stream may be supplied by some portion of the ECS. For example, the second gas stream may be a portion of a discharge stream produced by the second system (e.g., the ECS), such as a discharge stream (e.g., a hot side) in fluidic communication with a condenser of the ECS. In examples, the second system is configured to provide the discharge stream at a pressure greater than the pressure of the first gas stream. The cooling system may be configured to reduce the pressure of the discharge stream of the second system (e.g., to throttle the discharge stream) based on the pressure of the first gas stream, such that the greater pressure of the discharge stream does not adversely impact the pressure of the first gas stream and/or operations of the first system (e.g., the fuel cell).

The cooling system includes control circuitry configured to adjust a flow of the second gas stream (e.g., from the ECS) based on a pressure of the first gas stream (e.g., the fuel cell), such that the first gas stream and the second gas stream each discharge into the flow junction to produce the mixed gas stream. The cooling system includes a pressure sensor configured to provide a pressure signal indicative of the pressure of the first gas stream to the control circuitry. The cooling system may include a first valve configured to control the flow of the first gas stream and a control valve configured to control the flow of the second gas stream. The control system is configured to operate the control valve to adjust the flow of the second gas stream based on the pressure signal indicative of the pressure of the first gas stream. The control system may be configured to operate the first valve to cause the first gas stream. Hence, the cooling system is configured to operate at least the control valve based on the pressure signal such that the first gas stream and the second gas stream each discharge into the flow junction as the flow junction provides the mixed gas stream to cool the brake assembly. Thus, the cooling system may be configured to merge the first gas stream and the second gas stream in a manner limiting and/or substantially preventing the second gas stream (e.g., from the ECS) from adversely impacting the operation of the first system (e.g., the fuel cell) providing the first gas stream.

The cooling system may be configured to initiate cooling to the brake assembly based on a temperature of at least some portion of the brake assembly. In examples, the cooling system includes a temperature sensor configured to provide a temperature signal indicative of the temperature of the brake assembly. For example, the temperature sensor may be within or in proximity to a wheel cavity, in thermal communication with the brake assembly, and/or otherwise situated to determine a temperature indicative of the temperature of the brake assembly. The control circuitry may be configured to receive the temperature signal and initiate cooling to the brake assembly by operating the first valve and the control valve when the temperature signal exceeds a threshold (e.g., during and/or following an aircraft landing). In examples, the control circuitry is configured to operate the first valve and/or the control valve to substantially maintain the temperature of the brake assembly within a temperature range (e.g., above or equal to a minimum temperature and below or equal to a maximum temperature).

In some examples, the control circuitry is configured to operate the first valve (e.g., to control the first gas stream) and/or the control valve (e.g., to control the second gas stream) based on a loading of the first system or the second system. For example, when the first system is a fuel cell configured to provide electrical power to an electrical load, the control circuitry may be configured to operate the first valve and/or the control valve based on the electrical power provided by and/or requested from the fuel cell, such that, for example, the fuel cell may continue to provide the electrical power. When the second system is an ECS configured to provide air at a particular flow rate, temperature, pressure, and/or other parameter, the control circuitry may be configured to operate the first valve and/or the control valve based on the air provided by and/or requested from the ECS, such that, for example, the ECS may continue to provide the air at the particular flow rate, temperature, pressure, and/or other parameter.

Hence, provided here is a cooling system configured to discharge a first gas stream and a second gas stream to a flow junction. The first gas stream may supplied by a first system such as a fuel cell onboard an aircraft. The second gas stream may be supplied by a second system such as an ECS onboard the aircraft. A flow junction is configured to merge the first gas stream and the second gas stream to provide a mixed gas stream to cool a brake assembly of a vehicle. Control circuitry is configured to adjust a flow of the second gas stream based on a pressure of the first gas stream to, for example, limit and/or substantially prevent adversely impacting operations of the first system and/or the second system. In examples, the cooling system includes a temperature sensor configured to provide a temperature signal indicative of a temperature of the brake assembly, and the control circuitry is to initiate cooling to the brake assembly based on the temperature signal. Thus, the cooling system may be configured to provide brake assembly cooling using systems onboard the vehicle and in a manner minimizing or eliminating the need for a ground crew to set-up and operate a cooling system separate from the vehicle.

FIG. 1 is a perspective view illustrating an example wheel 10. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 20. In some examples, interior surface 16 may include an inner diameter of tubewell 18 of wheel 10. For example, in some cases, interior surface 16 may be referred to as an inner diameter surface of wheel 10. Interior surface 16 and wheel hub 20 may define a wheel cavity 22 (e.g., a volume) between interior surface 16 and wheel hub 20. In some examples, a tire (not shown) may be mounted on exterior surface 14 of rim 12. Wheel 10 may include an inboard bead seat 24 and an outboard bead seat 26 configured to retain a tire on exterior surface 14 of rim 12. In examples, wheel 10 may comprise an inboard section 28 (e.g., including inboard bead seat 24) and an outboard section 30 (e.g., including outboard bead seat 26). Wheel 10 is configured to rotate around the axis of rotation A. An axial direction A1 of wheel 10 is parallel to the axis of rotation A and has a direction from inboard section 28 toward outboard section 30. In examples, the axial direction A1 is an outboard direction of wheel 10 and a direction opposite axial direction A1 is an inboard direction of wheel 10.

Wheel 10 includes a plurality of rotor drive keys 32 on interior surface 16 of wheel 10, such as rotor drive key 34 and rotor drive key 36. In some examples, each rotor drive key of the plurality of rotor drive keys 32 extends in a substantially axial direction of wheel 10 (e.g., in a direction parallel to the axis of rotation A). The plurality of rotor drive keys 32 ("rotor drive keys 32") and interior surface 16 are configured to be substantially stationary with respect to each other, such that when wheel 10 (and interior surface 16) rotates around axis of rotation A, each of the rotor drive keys (e.g., rotor drive keys 34, 36) translates over a closed path around axis A. Consequently, when wheel 10, interior surface 16, and rotor drive keys 32 are rotating around axis of rotation A, a force on one or more of rotor drive keys 32 opposing the direction of rotation acts to slow or cease the rotation. As will be discussed, rotor drive keys 32 may be configured to receive a torque from a braking system (not shown) configured to reduce and/or cease a rotation of wheel 10. Rotor drive keys 32 may be integrally formed with interior surface 16, or may be separate from and mechanically affixed to interior surface 16.

Figure 2:
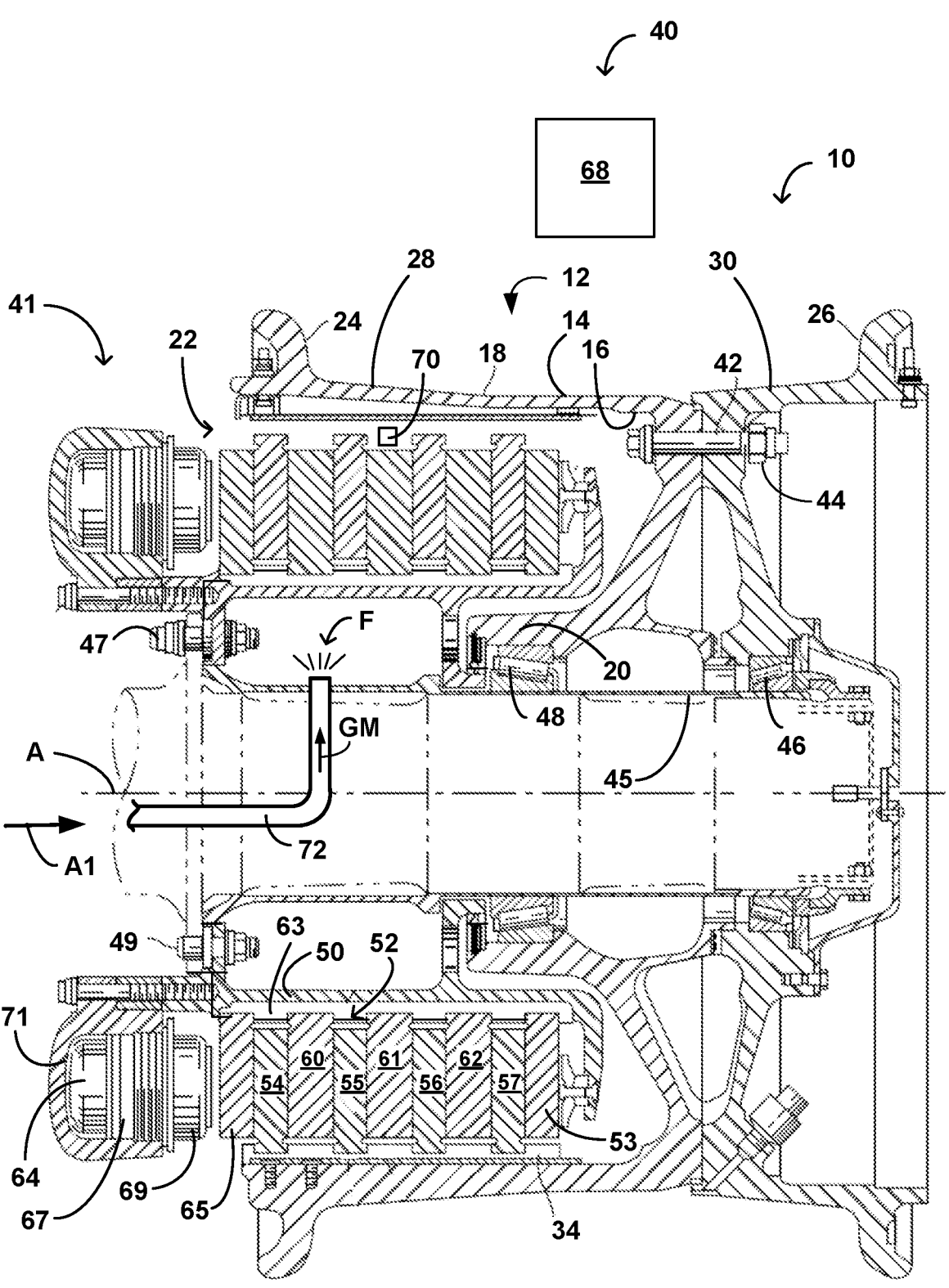
FIG. 2 is a schematic cross-sectional view illustrating an example wheel and brake assembly including the wheel of FIG. 1.

FIG. 2 is a schematic cross-sectional view illustrating wheel 10, an example brake assembly 41, and portions of a cooling system 40 configured to provide a mixed gas stream F to cool one or more components of brake assembly 41. Wheel 10 includes wheel rim 12, exterior surface 14, interior surface 16, wheel cavity 22, wheel hub 20, inboard bead seat 24, outboard bead seat 26, inboard section 28, outboard section 30, and rotor drive key 34. FIG. 2 illustrates wheel rim 12 as a split rim wheel with lug bolt 42 and lug nut 44 connecting inboard section 28 and outboard section 30, however wheel rim 12 may utilize other configurations (e.g., a unified wheel rim) in other examples.

Wheel 10 is configured to rotate about axis A extending through axial assembly 45. Axial assembly 45 is figured to support wheel 10 while allowing wheel 10 to rotate around axis A using bearing 46 and bearing 48. For example, bearings 46, 48 may define a substantially circular track around axial assembly 45. A torque tube 50 is coupled to axial assembly 45, such that torque tube 50 remains substantially rotationally stationary when wheel 10 rotates around axial assembly 45 and axis A. Torque tube 50 may at least partially surround an exterior of axial assembly 45. Axial assembly 45 may be mechanically coupled to a strut attached to a vehicle (e.g., a landing gear strut).

In the example shown in FIG. 2, brake assembly 41 is positioned within wheel 10 and is configured to engage main torque tube 50 and rotor drive key 34. Brake assembly 41 is configured to generate a torque to oppose a rotation of wheel 10 around axis A and transfer the torque to rotor drive key

34, reducing and/or eliminating the rotation of wheel 10 around axis A. Brake assembly 41 includes a disc stack 52 which includes one or more rotor discs (e.g., rotor discs 54, 55, 56, 57) and one or more stator discs (e.g., stator discs 60, 61, 62). Rotor discs 54, 55, 56, 57, and/or stator discs 60, 61, 62 may have any suitable configuration. For example, rotor discs 54, 55, 56, 57 and/or stator discs 60, 61, 62 can each be substantially annular discs surrounding axial assembly 45. Stator discs 60, 61, 62 are coupled to torque tube 50 via spline 63 and remain rotationally stationary with torque tube 50 (and axial assembly 45) as wheel 10 rotates. Rotor discs 54, 55, 56, 57 are rotationally coupled to rotor drive key 34 and interior surface 16 and rotate substantially synchronously with wheel 10 around axis A.

An actuator 64 is configured to compress disc stack 52 to bring friction surfaces of rotor discs 54, 55, 56, 57 into contact with friction surfaces of stator discs 60, 61, 62 generating shearing forces between the discs. The shearing forces cause rotor discs 54, 55, 56, 57 to exert a torque on rotor drive key 34 opposing a rotation of wheel 10. In some examples, actuator 64 is configured to compress disc stack 52 using a pressure plate 65. Actuator 64 is configured to cause a piston 69 to translate relative to a body 67 of actuator 64 to compress disc stack 52. Actuator 64 may cause piston 69 to translate using any suitable method. In some examples, actuator 64 is configured to cause translation of piston 69 by supplying and/or venting a pressurized hydraulic fluid to or from a piston chamber. In addition or instead, in some examples, actuator 64 is configured to cause piston 69 to translate through a motion (e.g., a rotary motion) generated by an electric motor. In the example shown in FIG. 2, actuator 64 is configured to compress disc stack 52 against a backing plate 53.

A housing 71 is configured to partially or fully cover and/or protect one or more components of brake assembly 41, such as actuator body 67. Housing 71 may be configured to attach to torque tube 50 and/or another component of brake assembly 41 configured to remain substantially stationary with respect to torque tube 50. In some examples, housing 71 is configured to at least partially extend outside of wheel cavity 22 on a side of wheel 10 including inboard section 28 (e.g., an inboard side of wheel 10).

The shearing forces generated between rotor discs 54, 55, 56, 57 and stator discs 60, 61, 62 when actuator 64 compresses disc stack 52 act to convert kinetic energy (e.g., of an aircraft) to thermal energy. Disc stack 52 may act as a heat sink to absorb some part of the thermal energy, leading to increases in the temperature of rotor discs 54, 55, 56, 57 and/or stator discs 60, 61, 62. In examples, disc stack 52 acts as a heat sink to absorb most of the thermal energy. The increased temperatures may accelerate the oxidation, and may decrease the braking performance and lifecycle of brake assembly 41. In some cases, following an operation of brake assembly 41, cooling of brake assembly 41 (e.g., disc stack 52) may be required in order to ensure sufficient braking power is available before subsequent operation. For example, following an aircraft landing, forced convection cooling may be provided to a brake assembly such as brake assembly 41 in order to reduce the temperature of disc stack 52 prior to subsequent operation (e.g., during a scheduled take off and/or taxiing). In some circumstances, the requirement for brake cooling may result in tarmac delays for an aircraft when, for example, a cooling system substantially separate (e.g., having a fan or other components physically separate from the aircraft) from brake assembly 41 and wheel 10 must be set up and operated by ground crew personnel before the forced convection cooling may commence.

A cooling system 40 is configured to merge a first gas stream (e.g., from a first system on board a vehicle) and a second gas stream (e.g., from a second system onboard the vehicle) and deliver mixed gas stream GM to provide a flow F for cooling of brake assembly 41. Cooling system 40 includes control circuitry 68 configured to initiate and/or secure the delivery of mixed gas stream GM. Control circuitry 68 is configured to adjust a flow of the second gas stream (e.g., second gas stream G2 (FIG. 3)) based on a pressure of the first gas stream (e.g., first gas stream G1 (FIG. 3)) as the first gas stream and the second gas stream merge to produce the mixed gas stream GM. In examples, control circuitry 68 is configured to initiate and/or secure the delivery of mixed gas stream GM based on a temperature signal from temperature sensor 70. Temperature sensor 70 is configured to provide a temperature signal indicative of a temperature of one or more components of brake assembly 41, such as one or more of rotor discs 54, 55, 56, 57, stator discs 60, 61, 62, and/or another component of brake assembly. For example, temperature sensor 70 may be within or in proximity to wheel cavity 22, in direct thermal communication with one or more components of brake assembly 41 (e.g., in conductive thermal communication), and/or otherwise situated to determine a temperature indicative of a temperature of one or more components of brake assembly 41. In examples, cooling system 40 includes a conduit 72 configured to direct mixed gas stream GM from a flow junction (e.g., flow junction 74 (FIG. 3)) to produce the flow F at a location in proximity to brake assembly 41 (e.g., to wheel cavity 22).

Wheel 10 may be used with any variety of private, commercial, or military aircraft or other type of vehicle. Wheel 10 may be mounted to a vehicle using, for example, bolts 47 and/or bolts 49, or some other fastening device. Axial assembly 45 may be mounted on a strut of a landing gear (not shown) or other suitable component of a vehicle to connect wheel 10 to the vehicle. Wheel 10 may rotate around axis A and axial assembly 45 to impart motion to the vehicle. Wheel 10 is shown and described to provide context to the brake assembly described herein, however the brake assembly described herein may be used with any suitable wheel assembly in other examples.

Figure 3:
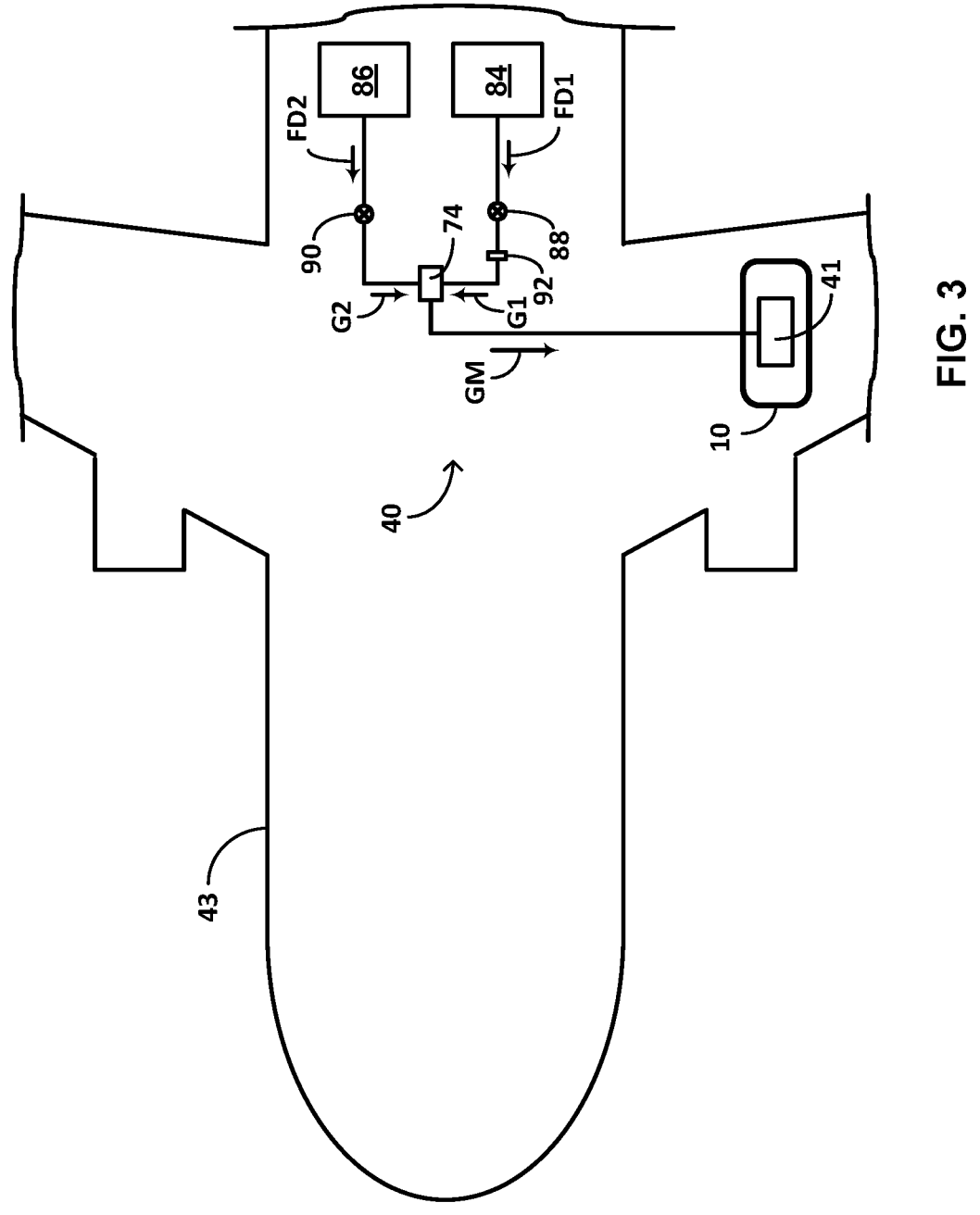
FIG. 3 is a schematic plan view illustrating a cooling system, a first system, and a second system on board an aircraft.

FIG. 3 schematically illustrates an example cooling system 40 configured to provide brake cooling to a brake assembly 41 of wheel 10 configured to impart motion to an aircraft 43. Aircraft 43 may include a first system 84 configured to produce a first discharge stream FD1. Aircraft 43 may include a second system 86 configured to produce a second discharge stream FD2. In examples, first system 84 includes a fuel cell configured to generate electrical power for use by aircraft 43. First discharge stream FD1 may be an exhaust stream (e.g., a cathode exhaust stream) of the fuel cell. In examples, second system 86 may include an environmental control system configured to condition and issue air to a cabin of aircraft 43. Second discharge stream FD2 may be some portion of the air being conditioned within second system 86, such as a portion of an air stream downstream of a condenser of the environmental control system.

Cooling system 40 is configured to merge a first gas stream G1 and a second gas stream G2 using a flow junction 74 to produce a mixed gas stream GM. Flow junction 74 is configured to issue mixed gas stream GM to a location in proximity to brake assembly 41 of wheel 10, such as a location within wheel cavity 22 (FIG. 2). First gas stream G1 may be at least a portion of first discharge stream FD1. Second gas stream G2 may be at least a portion of second discharge stream FD2.

Cooling system 40 includes control circuitry 68 configured control a flow of first gas stream G1 (e.g., using a first valve 88) and control a flow of second gas stream G2 (e.g., using a control valve 90) as first gas stream G1 and second gas stream G2 enter flow junction 74, and flow junction 74 discharges mixed gas flow MG to cool brake assembly 41. In examples, control circuitry 68 controls the flow of second gas stream G2 and/or first gas stream G1 based on a pressure of first gas stream G1. For example, control circuitry may receive a pressure signal indicative of the pressure of first gas stream G1 from a pressure sensor 92. Control circuity 68 may control the flow rate of second gas stream G2 and/or first gas stream G1 such that first gas stream G1 and second gas stream G2 each enter flow junction 74 as flow junction 74 discharges mixed gas flow MG from junction outlet 82. Cooling system 40 may be configured to control the flow rate of second gas stream G2 and/or first gas stream G1 to limit and/or substantially avoid potential backflows and/or pressure increases in first gas stream G1 and/or second gas stream G2 that might adversely impact the operations of first system 84 and/or second system 86. For example, when first gas stream G1 is a portion of an exhaust stream of a fuel cell (e.g., a cathode exhaust stream), cooling system 40 may be configured to control the flow rate of second gas stream G2 and/or first gas stream G1 to limit and/or substantially avoid potential backflows and/or pressure increases in first gas stream G1 that might adversely impact the operation of the fuel cell.

Figure 4:
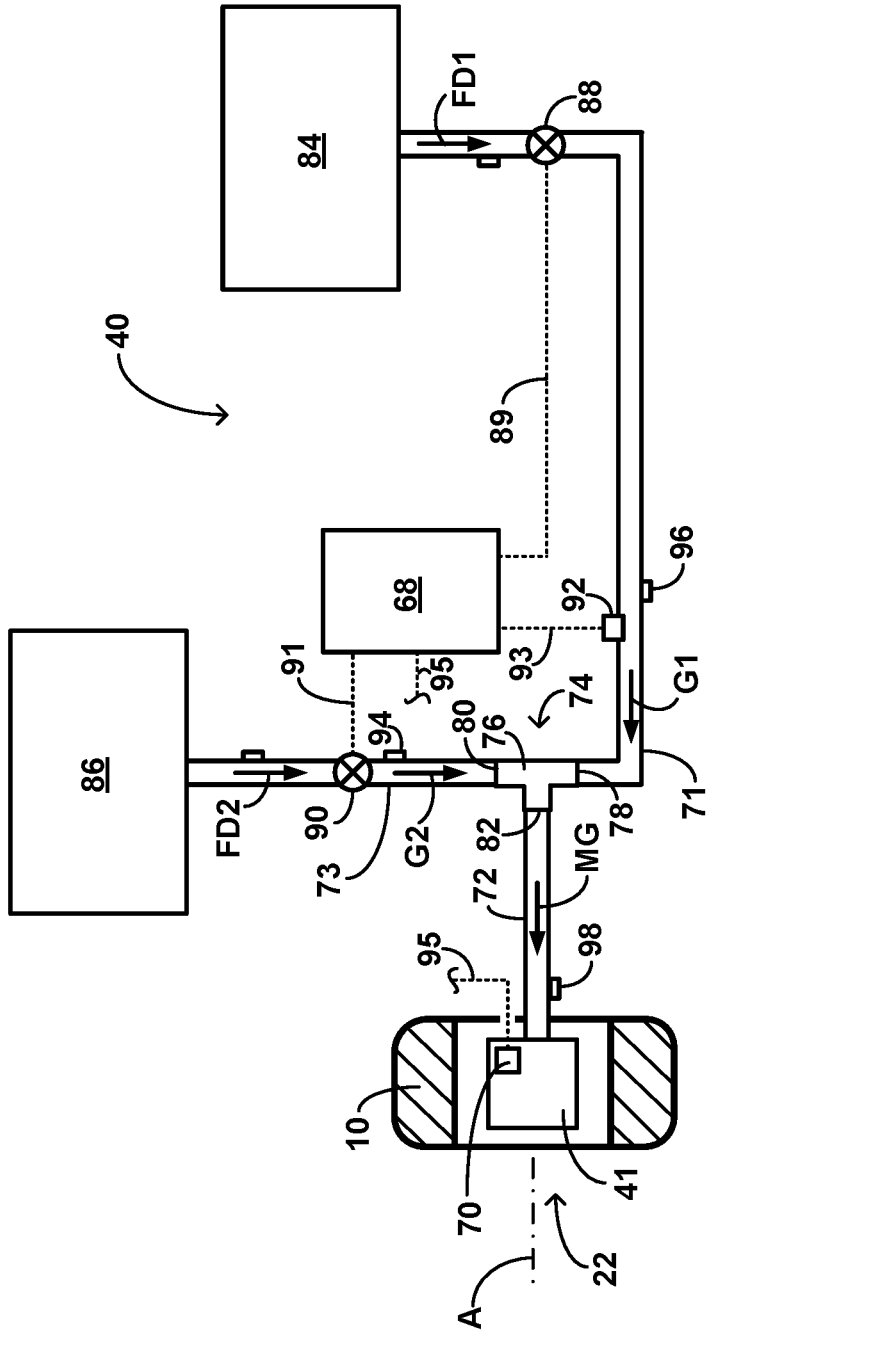
FIG. 4 is a schematic plan view illustrating an example cooling system providing a mixed gas flow to cool a brake assembly.

FIG. 4 schematically illustrates cooling system 40 configured to provide brake cooling to brake assembly 41. Cooling system 40 is configured to define a first flow path for a first gas stream G1 and define a second flow path for a second gas stream G2 and deliver a mixed gas stream GM to cool brake assembly 41. Cooling system 40 includes flow junction 74 configured to receive first gas stream G1 and second gas stream G2 and discharge the mixed gas stream GM. Flow junction 74 may be configured to provide and/or produce mixed gas stream GM to cool brake assembly 41 via a flow path defined by conduit 72.

In examples, flow junction 74 includes a body 76 ("flow junction body 76") defining a first inlet 78 ("first junction inlet 78"), a second inlet 80 ("second junction inlet 80"), and an outlet 82 ("junction outlet 82"). Flow junction 74 may be configured to receive first gas stream G1 at first junction inlet 78 and receive second gas stream G2 at second junction inlet 80. Flow junction 74 may be configured to discharge mixed gas stream GM via junction outlet 82 when first junction inlet 78 receives first gas stream G1 and second junction inlet 80 receives second gas stream G2. In examples, junction outlet 82 is in fluidic communication with conduit 72. Cooling system 40 may include a first conduit 71 configured to define the first flow path for first gas stream G1 and/or may include a second conduit 73 configured to define the second flow path for second gas stream G2. In examples, first conduit 71 is in fluidic communication with first junction inlet 78. Second conduit 73 may be in fluidic communication with second junction inlet 80.

Cooling system 40 is configured to operate such that first gas stream G1 and second gas stream G2 each discharge into flow junction 74 as flow junction 74 issues mixed gas stream GM to cool brake assembly 41. In examples, cooling system 40 is configured to limit and/or substantially prevent one gas stream (e.g., second gas stream G2) from causing a backflow and/or substantial pressure increase in the other gas stream (e.g., first gas stream G1). The potential backflow and/or pressure increase may adversely impact the operations of one or more systems fluidically connected to first gas stream G1 and/or second gas stream G2 as cooling system 40 provides cooling to brake assembly 41. Cooling system 40 may be configured to substantially establish and/or monitor the flow rates of first gas stream G1 and second gas stream G2 to limit and/or avoid potential backflows and/or pressure increases of one gas flow (e.g., first gas flow G1) caused by the flow of the other gas flow (e.g., second gas flow G2) into flow junction 74.

For example, cooling system 40 may be configured to limit and/or substantially prevent second gas stream G2 from causing a pressure buildup within flow junction 74 which might adversely impact the discharge of first gas stream G1 into first junction inlet 78. Cooling system 40 may be configured to substantially monitor and/or establish flow conditions (e.g., monitor and/or establish one or more flow parameters) of first gas stream G1 and/or second gas stream G2 such that first gas stream G1 and second gas stream each discharge into flow junction 74 as flow junction 74 issues mixed gas stream GM to cool brake assembly 41. In examples, cooling system 40 substantially monitor and/or establish flow conditions Hence, cooling system 40 may be configured to limit and/or substantially avoid potential backflows and/or pressure increases in first gas stream G1 and/or second gas stream G2 that might adversely impact the operations of one or more systems fluidically connected to first gas stream G1 and/or second gas stream G2.

In examples, cooling system 40 substantially monitors and/or establishes flow conditions of first gas stream G1 and/or second gas stream G2 by controlling a flow rate of second gas stream G2 based on a pressure within first gas stream Gl. Cooling system 40 may be configured to adjust the flow rate of second gas stream G2 based on the pressure within first gas stream G1 as flow junction 74 merges first gas stream G1 and second gas stream G2, such that, for example, cooling system 40 provides mixed gas flow MG in a manner substantially limiting potential backflows and/or substantial pressure increases in first gas stream Gl.

Cooling system 40 includes a first valve 88 configured to control the flow of first gas stream G1 and a control valve 90 configured to control the flow of second gas stream G2. Cooling system 40 further includes a pressure sensor 92 configured to provide a pressure signal indicative of the pressure within first gas stream G1. Control circuitry 68 is configured to control a position of first valve 88 (e.g., through communication via communication link 89) and control a position of control valve 90 (e.g., through communication via communication link 91). Control circuitry 68 is configured to receive the pressure signal from pressure sensor 92 (e.g., through communication via communication link 93). Control circuitry 68 is configured to operate at least control valve 90 to adjust a flow of second gas stream G2 based on the pressure signal provided by pressure sensor 92. Control circuity 68 may be configured to control a flow rate of second gas stream G2 such that first gas stream G1 enters first junction inlet 78 and second gas stream G2 enters second junction inlet 80 as flow junction 74 discharges mixed gas flow MG from junction outlet 82.

In examples, cooling system 40 is configured to receive first gas stream G1 from a first system 84. For example, first system 84 may be configured to discharge a first discharge stream FD1, and cooling system 40 may be configured such that first gas stream G1 is at least some portion of first discharge stream FD1. First valve 88 may be configured to provide a flow restriction (e.g., a variable flow restriction) between first discharge stream FD1 and first gas stream G1 to control the flow of first gas stream G1. In examples, first valve 88 is configured such that a position of first valve 88 determines a magnitude of a flow resistance through the flow restriction (e.g., a magnitude of the flow resistance caused by a restricting element such as a globe, gate, ball, or other restricting element within first valve 88). Thus, first valve 88 may be configured such that a flow rate of first gas stream G1 is dependent on the position of first valve 88.

First valve 88 may be configured to substantially regulate a flow from first discharge stream FD1 to first gas stream G1 (e.g., to function as a regulating valve). In some examples, first valve 88 may be configured to fluidically isolate first discharge stream FD1 and first gas stream G1 (e.g., to function as a shut off and/or isolation valve). In examples, first system 84 is a fuel cell on board a vehicle such as an aircraft. First discharge stream FD1 may be, for example, some portion of an exhaust stream discharged by the fuel cell, such as a cathode exhaust stream.

In examples, cooling system 40 is configured to receive second gas stream G2 from a second system 86. For example, second system 86 may be configured to discharge a second discharge stream FD2, and cooling system 40 may be configured such that second gas stream G2 is at least some portion of second discharge stream FD2. Control valve 90 may be configured to provide a flow restriction (e.g., a variable flow restriction) between second discharge stream FD2 and second gas stream G2 to control the flow of second gas stream G2. In examples, control valve 90 is configured such that a position of control valve 90 determines a magnitude of a flow resistance through the flow restriction of control valve 90 (e.g., a magnitude of the flow resistance caused by a restricting element such as a globe, gate, ball, or other restricting element within control valve 90). Thus, control valve 90 may be configured such that a flow rate of second gas stream G2 is dependent on the position of control valve 90.

In examples, control valve 90 may be configured to substantially regulate a flow from second discharge stream FD2 to second gas stream G2 (e.g., to function as a regulating valve). In some examples, control valve 90 may be configured to fluidically isolate second discharge stream FD2 and second gas stream G2 (e.g., to function as a shut off and/or isolation valve). In examples, second system 86 is an ECS on board a vehicle such as an aircraft. Second discharge stream FD2 may be, for example, some portion of an air stream discharged by or within the ECS, such as a portion of an air stream exiting a condenser of the ECS. In examples, first system 84 is configured to issue first discharge stream FD1 at a first pressure, and second system 86 is configured to issue second discharge stream FD2 at a second pressure greater than the first pressure.

Control circuitry 68 may be configured to operate control valve 90 to adjust a flow of second gas stream G2 based on a pressure signal from pressure sensor 92 in any manner. In some examples, control circuitry 68 is configured to correlate a position of control valve 90 with the pressure signal, and establish the position of control valve 90 based on the correlation. In some examples, control circuitry 68 is configured to correlate a flow rate of second gas flow G2 with the pressure signal, and position control valve 90 to substantially establish the flow rate based on the correlation. In some examples, cooling system 40 includes a sensor 94 ("second stream sensor 94") configured to determine and provide a flow signal indicative of a flow rate of second gas stream G2 and/or a pressure signal indicative of a pressure of second gas stream G2. Control circuitry 68 may be configured to receive the flow signal indicative of the flow rate and/or pressure of second gas stream G2 from second stream sensor 94, and position control valve 90 to substantially establish a particular flow rate and/or particular pressure of second gas stream G2, with the particular flow rate and/or particular pressure based on a correlation between the flow rate and/or pressure of second gas flow G2 and the pressure signal from pressure sensor 92.

In some examples, control circuitry 68 may be configured to correlate a flow rate of first gas stream G1 with the pressure signal from pressure sensor 92. Control circuitry 68 may be configured to correlate a position of control valve 90 with the flow rate of first gas stream G1 determined from the correlation, and position control valve 90 based on the correlation. In some examples, cooling system 40 includes a sensor 96 ("first stream sensor 96") configured to determine and provide a flow signal indicative of a flow rate of first gas stream G1 and/or a pressure signal indicative of a pressure of first gas stream G1. Control circuitry 68 may be configured to receive the flow signal indicative of the flow rate and/or pressure of first gas stream G1 from first stream sensor 96, and position control valve 90 to substantially establish a given flow rate and/or given pressure of second gas stream G2 based on the flow signal from first stream sensor 96.

In some examples, cooling system 40 includes a sensor 98 ("mixed stream sensor 98") configured to determine and provide a flow signal indicative of a flow rate of mixed gas stream GM and/or a pressure signal indicative of a pressure of mixed gas stream GM. Control circuitry 68 may be configured to receive the flow signal indicative of the flow rate and/or pressure of mixed gas stream GM from mixed stream sensor 98, and position control valve 90 and/or first valve 88 to substantially establish a certain flow rate and/or certain pressure of mixed gas stream GM. In some examples, the certain flow rate and/or certain pressure may be based on a correlation between the flow rate and/or pressure of second gas flow G2 and the pressure signal from pressure sensor 92. In some examples, the certain flow rate and/or certain pressure may be based on (e.g., determined from) one or more of a signal communicated by pressure sensor 92, first stream sensor 96, second stream sensor 94, and/or mixed stream sensor 98.

In examples, control circuitry 68 is configured to initiate and/or secure the delivery of mixed gas stream GM based on a temperature signal from temperature sensor 70. Temperature sensor 70 is configured to provide a temperature signal indicative of a temperature of one or more components of brake assembly 41, such as one or more of rotor discs 54, 55, 56, 57, stator discs 60, 61, 62 (FIG. 2), and/or another component of brake assembly 41. Control circuitry 68 may be configured to receive the temperature signal from temperature sensor 71 (e.g., through communication via communication link 95).

In examples, control circuitry 68 is configured to receive the temperature signal from temperature sensor 70 (e.g., via communication link 95) and initiate cooling to brake assembly 41 by operating (e.g., opening) first valve 88 and/or control valve 90 when the temperature signal exceeds a threshold. The threshold may be indicative of, for example, a temperature expected during and/or following an aircraft landing. In some examples, control circuitry 68 is configured to operate first valve 88 and/or control valve 90 to substantially maintain the temperature of brake assembly 41 within a temperature range (e.g., using the temperature signal received from temperature sensor 70). For example, control circuitry 68 may be configured to operate first valve 88 and/or control valve 90 to initiate cooling from cooling system 40 to brake assembly 41 when the temperature signal received from temperature sensor 70 indicates a temperature greater than or equal to an upper temperature. Control circuitry 68 may be configured to operate first valve 88 and/or control valve 90 to secure cooling from cooling system 40 to brake assembly 41 when the temperature signal received from temperature sensor 70 indicates a temperature less than or equal to a lower temperature. The lower temperature may be a temperature less than the upper temperature.

Providing cooling from cooling system 40 to brake assembly 41 in a temperature range between and/or including the upper temperature and the lower temperature may be desired when one or more components of brake assembly 41 are designed and/or intended for operation within a temperature range above the lower temperature and/or below the upper temperature. For example, one or more of rotor discs 54, 55, 56, 57, stator discs 60, 61, 62, and/or other component of brake assembly 41 may be configured to provide relatively higher braking performance for a vehicle when the one or more of rotor discs 54, 55, 56, 57, stator discs 60, 61, 62, and/or other component has a temperature within a specific temperature range. Cooling system 40 may be configured such that the lower temperature (e.g., as indicated by temperature sensor 70) and/or the upper temperature (e.g., as indicated by temperature sensor 70) define a range encompassing some portion of or substantially all of the specific temperature range. Hence, control circuitry 68 may be configured initiate and/or secure cooling from cooling system 40 to brake assembly 41 to substantially maintain a temperature of a component of brake assembly 41 (e.g., one or more of rotor discs 54, 55, 56, 57, stator discs 60, 61, 62, and/or other component) within the specific temperature range, such that, for example, brake assembly 41 may provide relatively higher braking performance for a vehicle.

Conduit 72 may be configured to produce the flow F (FIG. 2) at a location in proximity to brake assembly 41 (e.g., to wheel cavity 22) as wheel 10 and axis A translate and/or are translated relative to one or more components of cooling system 40 (e.g., first system 84, second system 86, conduit 71, conduit 73, first valve 88, control valve 90, and/or other components of cooling system 40). For example, when wheel 10 is coupled to a landing gear of an aircraft, conduit 72 may be configured to produce the flow F during the raising or lowering of the landing gear, such that the cooling system requires minimal or no set-up to provide cooling to brake assembly 41 when desired (e.g., following an aircraft landing, or while the landing gear is raised, or some other time). In examples, conduit 72 is configured to remain fluidically connected to the location in proximity to brake assembly 41 (e.g., to wheel cavity 22) when wheel 10 and axis A have a first position relative to the one or more components of cooling system 40, when wheel 10 and axis A have a second position different from the first position relative to the one or more components of cooling system 40, and/or when wheel 10 and axis A translate between the first position and the second position. Conduit 72 may be configured to direct mixed gas stream GM from flow junction 74 to produce the flow F when wheel 10 and axis A have the first position, when wheel 10 and axis A have the second position, and/or when wheel 10 and axis A translate between the first position and the second position.

In some examples, cooling system 40 may be configured to fluidically isolate second gas stream G2 and second discharge stream FD2 (e.g., using control valve 90), such that cooling system 40 provides mixed gas stream GM using first gas stream G1 either alone or with a greatly diminished flow rate of second gas stream G2. For example, control circuitry 68 may be configured to position control valve 90 to a control valve shut position to fluidically isolate second discharge stream FD2 and second gas stream G2 (e.g., fluidically isolate second system 86 and conduit 73). Control circuitry 68 may be configured to produce mixed gas flow GM and provide cooling to brake assembly 41 using first gas stream G1 when control valve 90 is in the control valve shut position. Hence, cooling system 40 may be configured to utilize first discharge stream FD1 and/or first gas stream G1 substantially alone (e.g., without second gas stream G2) to provide cooling to brake assembly 41. For example, cooling system 40 may be configured to utilize first discharge stream FD1 and/or first gas stream G1 substantially alone under certain operating conditions of first system 84 (e.g., fuel cell 102) and/or second system 86 (e.g., the environmental control system).

In some examples, cooling system 40 may be configured to fluidically isolate first gas stream G1 and first discharge stream FD1 (e.g., using first valve 88), such that cooling system 40 provides mixed gas stream GM using second gas stream G2 either alone or with a greatly diminished flow rate of first gas stream G1. For example, control circuitry 68 may be configured to position first valve 88 to a first valve shut position to fluidically isolate first discharge stream FD1 and first gas stream G1 (e.g., fluidically isolate first system 84 and conduit 71). Control circuitry 68 may be configured to produce mixed gas flow GM and provide cooling to brake assembly 41 using second gas stream G2 when first valve 88 is in the first valve shut position. Hence, cooling system 40 may be configured to utilize second discharge stream FD2 and/or second gas stream G2 substantially alone (e.g., without first gas stream G1) to provide cooling to brake assembly 41. For example, cooling system 40 may be configured to utilize second discharge stream FD2 and/or second gas stream G2 substantially alone under certain operating conditions of first system 84 (e.g., fuel cell 102) and/or second system 86 (e.g., the environmental control system).

In some examples, conduit 72 includes a flexible hose or other flexible conduit configured remain fluidically connected to the location in proximity to brake assembly 41 (e.g., to wheel cavity 22) when wheel 10 and axis A have the first position, wheel 10 and axis A have the second position, and/or when wheel 10 and axis A translate between the first position and the second position. In some examples, cooling system 40 may include one or more fans and/or other flow motivators configured to assist and/or cause the flow of mixed gas stream GM through conduit 72 to produce the flow F. The one or more fans and/or other flow motivators may be configured to generate a differential pressure boosting and/or enhancing a flow in conduit 72, conduit 71, and/or conduit 73. For example, the one or more fans and/or other flow motivators may be configured to generate a differential pressure that increases a pressure in first gas stream G1, second gas stream G2, and/or mixed gas stream GM.

Figure 5:
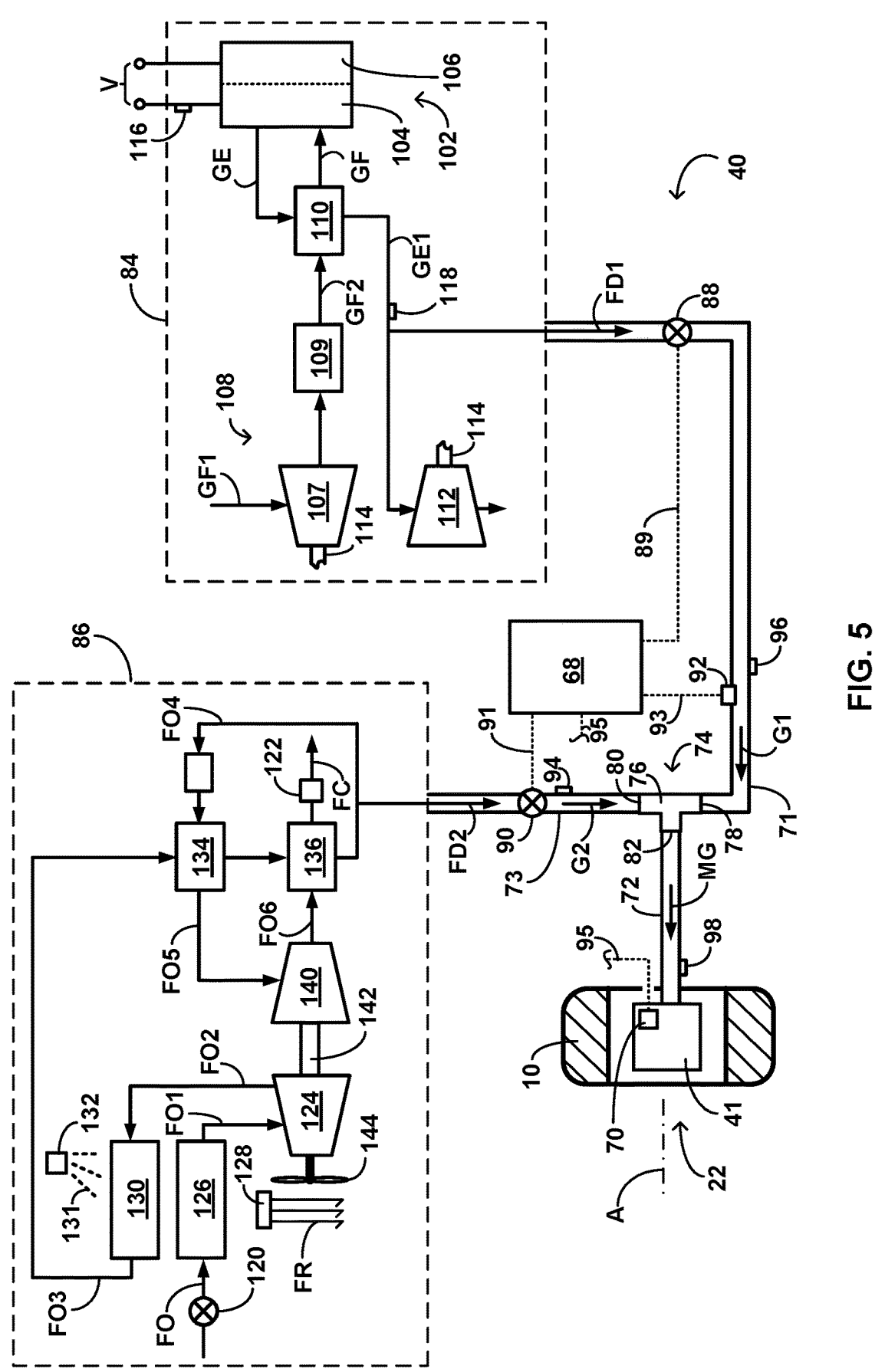
FIG. 5 is a perspective view illustrating an example cooling system using a discharge from a fuel cell and a discharge from an environmental control system.

FIG. 5 schematically illustrates an example cooling system 40 configured to provide brake cooling to a brake assembly 41. First system 84 is configured to provide first discharge stream FD1. Second system 86 is configured to provide second discharge stream FD2. Cooling system 40 is configured to merge first gas stream G1 and second gas stream G2, wherein first gas stream G1 is at least a portion of first discharge stream FD1 and second gas stream G2 is at least a portion of second gas stream FD2. In examples, first system 84 and/or second system 86 are systems on board a vehicle such as an aircraft. Brake assembly 41 may be configured to provide braking to wheel 10 of the vehicle.

In examples, first system 84 includes a fuel cell 102 configured to provide electrical power. Fuel cell 102 may be configured to receive gas stream GF and generate the electrical power using gas stream GF. In examples, gas stream GF comprises oxygen and one or more other gases such as nitrogen. For example, gas stream GF may be an air stream. Fuel cell 102 may be an oxide fuel cell configured to generate the electrical power by substantially extracting an oxidant (e.g., oxygen) from gas stream GF. Fuel cell 102 may be configured to substantially extract the oxidant and exhaust a gas stream GE, wherein gas stream GE is some portion of gas stream GF. In examples, when gas stream GF comprises oxygen and nitrogen (e.g., air), gas stream GE is a nitrogen-enriched air stream.

Fuel cell 102 may include a cathode side 104 and an anode side 106. Fuel cell 102 may be configured to receive gas stream GF at cathode side 104 and generate a voltage V between cathode side 104 and anode side 106 as fuel cell 102 substantially extracts the oxidant from gas stream GF. Fuel cell 102 may be configured to provide electrical power (e.g., to a vehicle such as an aircraft) using the voltage V. Anode side 106 may be configured to receive a fuel such as hydrogen, or another fuel. Fuel cell 102 may be configured to generate the voltage V as oxidant extracted from gas stream GF reacts with fuel received by anode side 106. In examples, a flow rate of gas stream GF received by (e.g., required by) fuel cell 102 is proportional to the electrical power provided by fuel cell 102. Hence, fuel cell 102 may be configured such that the flow rate of gas stream GF varies as the electrical power provided by fuel cell 102 varies, and/or vice-versa. In examples, fuel cell 102 is configured such that the flow rate of gas stream GF increases as the electrical power provided by fuel cell 102 increases. In examples, fuel cell 102 is configured such that the flow rate of gas stream GF decreases as the electrical power provided by fuel cell 102 decreases.

In examples, first system 84 is configured to provide first discharge stream FD1 using at least some portion of gas stream GE. For example, first system 84 may be configured to provide a gas stream GE1, where gas stream GE1 is at least some portion of gas stream GE. First system 84 may be configured such that first discharge stream FD1 is at least some portion of gas stream GE1.

In examples, first system 84 includes a compressor 108. In some examples, compressor 108 includes a first stage 107 and one or more additional stages, such as second stage 109. Compressor 108 (e.g., first stage 107) may be configured to receive a gas stream GF1 and provide gas stream GF to fuel cell 102. In examples, compressor 108 is configured to compress gas stream GF1 and provide a gas stream GF2, such that gas stream GF2 has a higher pressure than gas stream GF1. Gas stream GF may be some portion of gas stream GF2. In examples, first system 84 includes a heat exchanger 110 configured to cool (e.g., remove heat from) gas stream GF2 following compression by compressor 108. Heat exchanger 110 may be configured to transfer heat from gas stream GF2 to an exhaust stream (e.g., a cathode exhaust stream) of fuel cell 102, such as gas stream GE. In examples, heat exchanger 110 is configured to issue gas stream GE1, wherein gas stream GE1 is at least a portion of gas stream GE.

First system 84 may include a turbine 112 configured to receive at least some portion of an exhaust stream issued by fuel cell 102. For example, turbine 112 may be configured to receive at least some portion of gas stream GE1 and/or gas stream GE. Turbine 112 may be configured to generate mechanical power (e.g., rotary motion) using the at least some portion of gas stream GE1 and/or gas stream GE. In examples, turbine 112 is configured to provide at least some portion of the mechanical power to compressor 108 (e.g., first stage 107) using a shaft 114 (e.g., a common shaft) configured to cause rotation of compressor 108. In some examples, turbine 112 includes one or more windings configured to generate electrical power when turbine 112 generates mechanical power (e.g., rotary motion).

Hence, first system 84 may be configured such that first discharge stream FD1 provided to cooling system 40 is some portion of an exhaust gas stream issued by fuel cell 102, such as a cathode exhaust stream. First gas stream G1 may be at least some portion of first discharge stream FD1. Cooling system 40 is configured to discharge first gas stream G1 to flow junction 74, which is configured to merge first gas stream G1 and second gas stream G2 to provide mixed gas stream GM. Cooling system 40 (e.g., control circuitry 68) is configured to operate control valve 90 to adjust a flow of second gas stream G2 based on a pressure signal from pressure sensor 92 to, for example, limit and/or substantially reduce the impact of gas stream G2 on the pressure of and/or flow rate of gas stream G1 as flow junction 74 merges first gas stream G1 and second gas stream G2. By limiting and/or substantially reducing the impact of gas stream G2 on the pressure of and/or flow rate of gas stream G1, cooling system 40 may limit backpressures and/or flow rate changes on gas stream G1, which may limit backpressures and/or flow rate changes propagated to first gas discharge FD1. Limiting backpressures and/or flow rate changes propagated to first gas discharge FD1 may limit and/or substantially mitigate flow changes to gas stream GE, such that impacts to the operation of fuel cell 102 may be limited, substantially mitigated, and/or substantially avoided. Thus, cooling system 40 may be configured to provide mixed gas stream GM to brake assembly 41 in a manner limiting and/or substantially mitigating impacts on the operations of first system 84, such as fuel cell 102.

In some examples, control circuitry 68 may be configured to adjust and/or control a flow rate of first gas stream G1 using first valve 88. In examples, control circuitry is configured to adjust and/or control the flow rate of first gas stream G1 based on the electrical power provided by fuel cell 102. For example, control circuitry 68 may be configured to receive a communication from first system 84 indicative of the electrical power being provided by fuel cell 102. Control circuitry 68 may adjust and/or control first valve 88 to limit adverse impacts to the operation of fuel cell 102 as first gas stream G1 is withdrawn from an exhaust stream of fuel cell 102 (e.g., from gas stream GE and/or gas stream GE1). For example, control circuitry 68 may be configured to adjust and/or control first valve 88 to keep a pressure and/or flow rate of gas stream GE and/or gas stream GE1 at or above a pressure and/or flow rate limit required for the electrical power being provided by fuel cell 102. In some examples, first system 84 includes a sensor 116 configured to communicate a signal indicative of the electrical power provided by fuel cell 102 to control circuitry 68. First system 84 may include a sensor 118 configured to communicate a signal indicative of a pressure and/or flow rate of an exhaust stream of fuel cell 102 (e.g., gas stream GE1 and/or gas stream GE) to control circuitry 68.

Second system 86 may be configured to provide second discharge stream FD2 to cooling system 40. In examples, second system 86 is configured to provide second discharge stream FD2 at a pressure greater than the pressure of first discharge stream FD1 provided by first system 84. Second gas stream G2 may be at least a portion of second discharge stream FD2. Control circuitry 68 may be configured to substantially limit and/or mitigate the impact of the higher pressure of second discharge stream FD2 on the pressure of first gas stream G1, such that, for example, adverse impacts on the operation of first system 84 (e.g., fuel cell 102) may be limited and/or substantially avoided.

In examples, second system 86 is configured to provide an gas flow FC (e.g., an air flow) to a vehicle, such as an aircraft. Second system 86 may be configured to receive an gas flow FO and condition (e.g., cool) at least some portion of gas flow FO to provide gas flow FC. In examples, second system 86 is an environmental control system configured to provide gas flow FC to a cabin of a vehicle. Second system 86 may be configured such that second discharge FD2 is some portion of gas flow FO and/or gas flow FC. For example, second system 86 may include an inlet valve 120 configured to control and/or adjust the flow rate of gas flow FO into second system 86. Second system 86 may include an outlet 122 configured to discharge gas flow FC. Second system 86 may be configured to condition (e.g., cool, compress, humidify, and/or condition in other ways) gas flow FO as gas flow FO flows from inlet valve 120 to outlet 122. In examples, second system 86 is configured such that second discharge stream FD2 is some portion of the gas flow FO entering second system 86 via inlet valve 120. In some examples, second system 86 includes one or more conduits defining a conditioning flow path from inlet valve 120 to outlet 122, and control valve 90 and/or conduit 73 is fluidically coupled to the conditioning flow path.

In examples, second system 86 includes an ECS compressor 124 configured to receive and compress at least some portion of the gas flow FO entering second system 86 via inlet valve 120. Second system 86 may include a primary heat exchanger 126 configured to transfer heat between gas flow FO and an air flow FR (e.g., a ram-air flow). In examples, second system 86 includes an air inlet 128 configured to provide air flow FR. For example, air inlet 128 may be scoop or ram-air inlet configured to generate air flow FR during motion of a vehicle such as an aircraft which includes air inlet 128. Primary heat exchanger 126 may be configured to receive gas flow FO from inlet valve 120 and provide a gas flow FO1 to compressor 124. Compressor 124 may be configured to compress (e.g., pressurize) gas flow FO and generate a compressed gas flow FO2.

Second system 86 may include a secondary heat exchanger 130 configured to transfer heat between gas flow FO2 and air flow FO and/or air flow FR. Secondary heat exchanger 130 may be configured to receive gas flow FO2 from compressor 124 and provide a gas flow FO3. In examples, second system 86 is configured to inject a water spray 131 into at least some portion of gas flow FO (e.g., gas flow FO2) using a sprayer 132. Secondary heat exchanger 130 may be configured to provide gas flow FO3 to a reheater 134 and/or condenser 136. In examples, reheater 134 and/or condenser 136 are configured to alter a temperature and/or water content of some portion of gas flow FO (e.g., gas flow FO3) and produce a gas flow FO4. In examples, second system 86 (e.g., reheater 134) is configured to transfer heat between gas flow FO3 and gas flow FO4. In examples, second system 86 includes a water extractor 138 configured to remove water from gas flow FO4. Water extractor 138 may be configured to provide a water flow to sprayer 132 using the water extracted from gas flow FO4. In examples, reheater 134 and/or condenser 136 are configured to alter a temperature and/or water content of some portion of gas flow FO to provide a gas flow FO5.

Second system 86 may include an air cycle machine 140 configured to receive a gas flow and produce mechanical power and/or electrical power using the gas flow. Second system 86 may be configured to provide at least some portion of gas flow FO (e.g., gas flow FO5) to air cycle machine 140 such that air cycle machine 140 generates the mechanical power and/or electrical power. In examples, air cycle machine 140 provides at least some portion of the mechanical power to ECS compressor 124 via, for example, shaft 142. In some examples, air cycle machine 140 provides at least some portion of the mechanical power to a fan 144 configured to assist in the flow of air flow FR.

Air cycle machine 140 may be configured to expand (e.g., depressurize) some portion of gas flow FO (e.g., gas flow FO5) to provide a gas flow FO6. Second system 86 may be configured to provide at least some portion of gas flow FO6 to outlet 122. Gas flow FC provided by outlet 122 (e.g., to a cabin of an aircraft) may be some portion of gas flow FO6. In examples, second system 86 is configured to provide at least some portion of gas flow FO6 to condenser 136. Condenser 136 may be configured to transfer heat between gas flow FO3 (e.g., exiting reheater 134) and gas flow FO6.

In examples, as discussed, second system 86 includes one or more conduits defining a conditioning flow path from inlet valve 120 to outlet 122. Second system 86 may be configured to issue second discharge stream FD2 from some portion of the conditioning flow path. For example, control valve 90 and/or conduit 73 may be fluidically coupled to the conditioning flow path, such that the one or more conduits defining the conditioning flow path issue second discharge stream FD2 to control valve 90 and/or conduit 73. In examples, second system 86 (e.g., the conditioning flow path) is configured to provide some portion of gas flow FO4 (e.g., downstream of condenser 136) to control valve 90 and/or conduit 73, such that second discharge stream FD2 is some portion of gas flow FO4.

In some examples, cooling system 40 is configured such that second gas stream G2 is about 10% to about 30% (e.g., from about 15% to about 25%) of a total flow tapped from downstream of condenser 136. Second gas stream G2 may be controlled (e.g., by control circuitry 68 using control valve 90) based on the performance of second system 86 (e.g., the ECS pack). For example, Second gas stream G2 may be controlled based on comparison of the flow conditions of ECS compressor 124 and air cycle machine 140 (e.g., comparison of FO1 and/or FO2 with FO5 and/or FO6). In some examples, cooling system 40 is configured such that first gas stream G1 is about 45% to about 75% (e.g., from about 55% to about 65%) of a total flow tapped from downstream of heat exchanger 110. In examples, a temperature of second gas stream G2 is less than a temperature of first gas stream G1. For example, second gas stream G2 may have a temperature of from about 40° C. (degrees Celsius) to about 70° C. First gas stream G1 may have a temperature of from about 80° C. to about 120° C.

In examples, cooling system 40, first system 84, and second system 86 are each configured to be carried onboard a vehicle such as an aircraft. Wheel 10 may be a wheel of the vehicle configured to rotate to provide motion of the vehicle. Brake assembly 41 may be configured to provide braking to wheel 10 to limit and/or cease rotation of wheel 10 (e.g., limit and/or cease motion of the vehicle). In some examples, as discussed, first system 84 includes fuel cell 102 configured to provide electrical power to the vehicle and second system 86 is an environmental control system configured to provide a conditioned air flow to the vehicle. Hence, cooling system 40 may be configured to receive first discharge stream FD1 from a fuel cell to produce first gas stream G1 and receive second discharge stream FD2 from an environmental control system to produce second gas stream G2. Cooling system 40 (e.g., flow junction 74) may merge first gas stream G1 and second gas stream G2 to provide mixed gas flow GM for cooling of brake assembly 41 of wheel 10. Control circuitry 68 is configured to control control valve 90 to adjust a flow rate of second gas stream G2 based on a pressure of first gas stream G1. Control circuitry 68 may be configured to adjust the flow of second gas stream G2 to, for example, substantially limit pressure excursions and/or flow backups to first gas stream G1. Substantially limiting pressure excursions and/or flow backups to first gas stream G1 may limit pressure excursions and/or flow backups experienced by a cathode exhaust stream of fuel cell 102. Hence, cooling system 40 may be configured to provide cooling to brake assembly 41 using a first discharge stream provided by fuel cell 102 in a manner substantially reducing and/or mitigating adverse impacts to operations of fuel cell 102.

First valve 88 and/or control valve 90 may include a globe valve, a gate valve, a spool valve, a poppet valve, or any other type of valve mechanism or combination of mechanisms which may be configured to control a flow path from an inlet of the valve to an outlet of the valve, and/or may be configured to define and/or alter a flow area within the valve. In examples, first valve 88 and/or control valve 90 is a remotely actuated valve including an actuator configured to substantially establish, alter and/or adjust a position of first valve 88 and/or control valve 90 in response to, for example, communications from control circuitry 68. The actuator may be any type of actuator sufficient to substantially establish, alter and/or adjust the position of first valve 88 and/or control valve 90 (e.g., to substantially establish, alter and/or adjust the position of a restricting element of first valve 88 and/or control valve 90 relative to a body of first valve 88 and/or control valve 90). In examples, the actuator comprises a solenoid actuator configured to influence the position of first valve 88 and/or control valve 90. In some examples, the actuator is configured to position and/or alter a position of first valve 88 and/or control valve 90 based on a supply of a control fluid. For example, first valve 88 and/or control valve 90 may be a hydraulically or pneumatically operated valve.

The actuator may be configured to substantially establish, alter and/or adjust a position of first valve 88 and/or control valve 90 in response to a received electrical or electronic communication received via communication link 89 and/or communication link 91 (e.g., from control circuitry 68). First valve 88 and/or control valve 90 may include processing circuitry configured to control components of first valve 88 and/or control valve 90 in response to the received communication. The processing circuitry of the actuator may be some portion of processing circuitry 68 or may be substantially separate from processing circuitry 68. First valve 88 and/or control valve 90 may be configured to provide communications to other devices in data communication with processing circuitry 68.

Pressure sensor 92 may be any device configured to provide a pressure signal indicative of a pressure of a gas stream (e.g., first gas stream G1). In examples, pressure sensor 92 is configured to generate the pressure signal as a function of a pressure imposed on some portion of pressure sensor 92. Pressure sensor 92 may be configured to use any type of force collector to sense the pressure of the gas stream including, for example, diaphragms, pistons, bourdon tubes, bellows, or some other collector. Pressure sensor 92 may transduce the pressure into an electrical signal using, for example, piezoresistive strain gauges, capacitors, electromagnets, optical fibers, potentiometric wipers, or other devices. Pressure sensor 92 may be configured to sense an absolute pressure or a gauge pressure. The signal indicative of the pressure generated by pressure sensor 92 may be an analog electrical signal or a digital signal. Pressure sensor 92 may include processing circuitry configured to interpret a response of the force collector and generate the signal indicative of the pressure, and/or control circuitry 68 may include processing circuitry configured to interpret a response of the force collector and generate the signal indicative of the pressure. Pressure sensor 92 may be configured to provide communicate the signal indicative of the pressure to other devices in data communication with pressure sensor 92. Second stream sensor 94, first stream sensor 96, and/or mixed stream sensor 98, when configured to provide a signal indicative of a pressure of a gas stream, may be configured similarly to pressure sensor 92.

Second stream sensor 94, first stream sensor 96, and/or mixed stream sensor 98, when configured to provide a signal indicative of a flow rate, may be any device configured to provide a flow signal indicative of a flow rate of a gas stream. For example, second stream sensor 94, first stream sensor 96, and/or mixed stream sensor 98 may be configured to provide an indication of a flow rate using. For example, a venturi meter, an orifice plate, a Dall tube, a pitot tube, a linear resistance meter, an optical flowmeter, a sonar flowmeter, a magnetic flowmeter, a turbine flowmeter, a gear flowmeter, an obstruction type flowmeter, a paddle wheel flowmeter, and/or other devices configured to measure a flow rate. Second stream sensor 94, first stream sensor 96, and/or mixed stream sensor 98 may be configured to provide a flow signal indicative of the flow rate (e.g., an analog electrical signal or a digital signal). Second stream sensor 94, first stream sensor 96, and/or mixed stream sensor 98 may include processing circuitry configured to interpret a response of the flow meter and generate the flow signal indicative of the flow rate, and/or control circuitry 68 may include processing circuitry configured to interpret a response of the flow meter and generate the flow signal indicative of the flow rate. Second stream sensor 94, first stream sensor 96, and/or mixed stream sensor 98 may be configured to provide communicate the flow signal to other devices in data communication with second stream sensor 94, first stream sensor 96, and/or mixed stream sensor 98.

Communication link 89, 91, 93, 95 may be hard-line and/or wireless communications links. In some examples, communication link 89, 91, 93, 95 may comprise some portion of control circuitry 68. In some examples, communication link 89, 91, 93, 95 comprise a wired connection, a wireless Internet connection, a direct wireless connection such as wireless LAN, Bluetooth™, Wi-Fi™, and/or an infrared connection. communication link 89, 91, 93, 95 may utilize any wireless or remote communication protocol.

In examples, control circuitry 68 may include any one or more of a microcontroller (MCU), e.g., a computer on a single integrated circuit containing a processor core, memory, and programmable input/output peripherals, a microcontroller (μP), e.g., a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

In some examples, wheel 10 may be finish machined from a near-net-shaped aluminum forging and contain an axial assembly and/or wheel rim for assembly of brake assembly 41 and/or cooling system 40 onto wheel 10. In other examples, wheel 10 may be manufactured in a different manner. In yet other examples, wheel 10 may be obtained rather than manufactured. Wheel 10 may be made of any suitable material. In some examples, wheel 10 includes a metal or a metal alloy. For example, wheel 10 may include aluminum, a nickel alloy, a steel alloy (e.g., stainless steel), titanium, a carbon-composite material, or magnesium.

Brake discs described herein, including rotor discs 54, 55, 56, 57 and stator discs 60, 62, 62, may be manufactured from any suitable material. In some examples, the brake discs described herein may be manufactured from a metal or a metal alloy, such as a steel alloy. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven as either a single layer or multilayer structure.

FIG. 6 illustrates a flow diagram of an example technique for cooling a brake assembly. Although the technique is mainly described with reference to cooling system 40 and the components thereof (FIGS. 2-5), the technique may be used with other cooling systems in other examples. In addition, control circuitry 68 alone or in combination with control circuitry of other devices can perform any part of the technique shown in FIG. 6.

The technique may include detecting, using temperature sensor 70, a temperature of brake assembly 41 (602). The technique may include receiving, by control circuitry 68, a temperature signal indicative of the temperature of brake assembly 41 (604). In examples, control circuitry 68 receives the temperature signal from temperature sensor 70. Control circuitry 68 may operate first valve 88 and/or control valve 90 to initiate cooling to brake assembly 41 when the temperature signal indicates the temperature indicative of brake assembly 41 is equal to or greater than a temperature threshold (e.g., a upper temperature). In examples, control circuitry 68 operates first valve 88 and/or control valve 90 to substantially cease cooling to brake assembly 41 when the temperature signal indicates the temperature indicative of brake assembly 41 is less than or equal to a lower temperature.

The technique includes receiving, by control circuitry 68, a pressure signal indicative of a first gas stream G1 (606). Control circuitry 68 may receive the pressure signal from pressure sensor 92. In examples, the technique includes operating, using control circuitry 68, first valve 88 to cause first gas stream G1. First valve 88 may fluidically connect a conduit 71 defining a flow path for first gas stream G1 and a first discharge stream FD1 produced by a first system 84. First gas stream G1 may be at least a portion of first discharge stream FD1. In examples, first discharge stream FD1 is an exhaust stream (e.g., a cathode exhaust stream) of a fuel cell 102. In examples, fuel cell 102 provides first discharge stream FD1 as fuel cell 102 provides electrical power to a vehicle, such as an aircraft.

The technique includes adjusting, using control circuitry 68, a flow rate of a second gas stream G2 based on the pressure signal indicative of first gas stream G1 (608). In examples, the technique includes operating, using control circuitry 68, control valve 90 to adjust the flow rate of second gas stream G2. Control valve 90 may fluidically connect a conduit 73 defining a flow path for second gas stream G2 and a second discharge stream FD2 produced by a second system 86. Second gas stream G2 may be at least a portion of second discharge stream FD2. In examples, second discharge stream FD2 is produced by an environmental control system of a vehicle, such as an aircraft. In examples, the environmental control system provides second discharge stream FD2 as the environmental control system provides conditioned air to a cabin of a vehicle, such as a cabin of an aircraft.

The technique includes merging, using a flow junction 74, first gas stream G1 and second gas stream G2 to produce a mixed gas stream GM to provide cooling to a brake assembly 41 (610). Flow junction 74 may receive first gas stream G1 from conduit 71 (e.g., via first junction inlet 78) and receive second gas stream G2 from conduit 73 (e.g., via second junction inlet 80). Flow junction 74 may provide mixed gas stream GM to a conduit 72 defining a flow path for mixed gas stream GM. Conduit 72 may define the flow path for mixed gas stream GM from flow junction 74 to a location in proximity to brake assembly 41, such as a location within wheel cavity 22 or wheel 10 or another location in proximity to brake assembly 41. In examples, control circuitry 68 adjusts the flow rate of second gas stream G2 (e.g., using control valve 90) such that each of first gas stream G1 and second gas stream G2 flow into flow junction 74.

In examples, second system 86 provides second discharge stream FD2 at a pressure greater than a pressure of first stream FD1 provided by first system 84. In examples, control circuitry 68 operates first valve 88 and/or control valve 90 based on the electrical power provided by fuel cell 102. In examples, first gas stream G1 is a nitrogen-enriched air stream. In some examples, control circuitry 68 positions at least one of first valve 88 to a first valve shut position to fluidically isolate first gas stream G1 and flow junction 74 or the control valve 90 to a control valve shut position to fluidically isolate second gas stream G2 and flow junction 74. Flow junction 74 may discharge second gas stream G2 to cool brake assembly 41 when first valve 88 is in the first valve shut position or discharge first gas stream G1 to cool brake assembly 41 when control valve 90 is in the control valve shut position.

Second stream sensor 94 may determine and provide a flow signal indicative of a flow rate of second gas stream G2 and/or a pressure signal indicative of a pressure of second gas stream G2. Control circuitry 68 may receive the flow signal indicative of the flow rate and/or pressure of second gas stream G2 from second stream sensor 94. Control circuitry 68 may position control valve 90 to substantially establish a particular flow rate and/or particular pressure of second gas stream G2 based on the flow rate and/or pressure of second gas flow G2 and the pressure signal from pressure sensor 92. First stream sensor 96 may determine and provide a flow signal indicative of a flow rate of first gas stream G1 and/or a pressure signal indicative of a pressure of first gas stream G1. Control circuitry 68 may receive the flow signal indicative of the flow rate and/or pressure of first gas stream G1 from first stream sensor 96. Control circuitry 68 may position first valve 88 to substantially establish a particular flow rate and/or particular pressure of first gas stream G1 based on the flow rate and/or pressure of first gas flow G1 indicated by first stream sensor 96.

Figure 7:
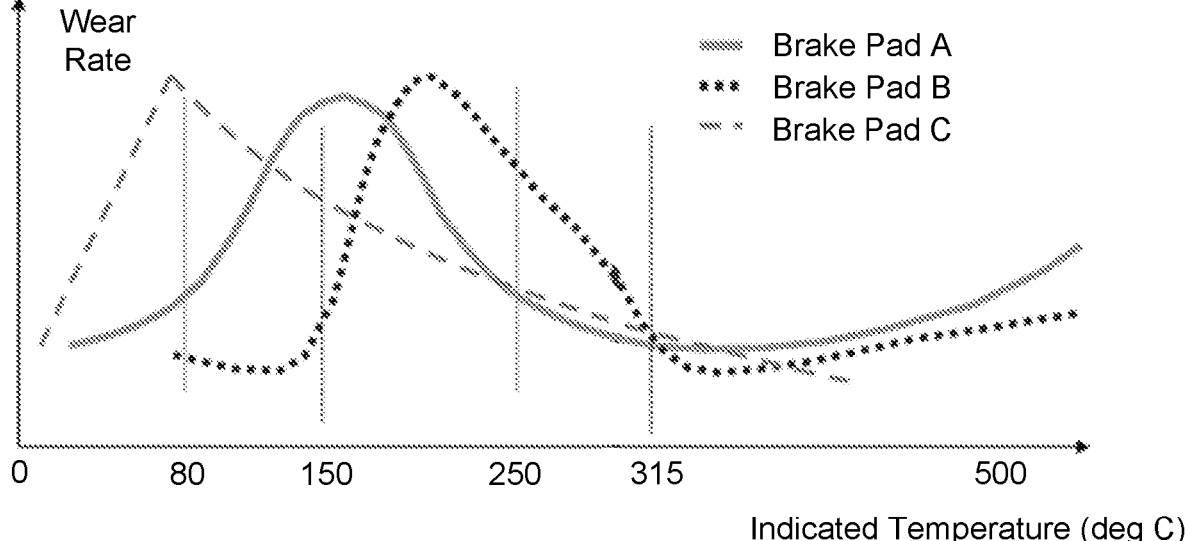
FIG. 7 is a diagram illustrating a comparative spectrum of the rate of carbon wear at different indicated temperatures for three types of brake pads.

The temperature threshold may be a pre-programmed temperature set based on a type of brake pad used in brake assembly 41 (e.g., used by rotor discs 54, 55, 56, 57 and/or stator discs 60. 62, 62). For example, many commercially available brake pads have an optimal temperature range that result in a reduced wear rate. FIG. 7 is a diagram illustrating a comparative spectrum of the rate of carbon wear at different indicated temperatures for three commercially available C-C brake pads from three common manufactures. As shown in the FIG. 7, the relationship between the disc temperature and wear rate of the disc is non-linear and is also different for different brake manufacturers.

The temperature threshold may be a pre-programmed temperature set based on the type of brake pad used in brake assembly 41. For example, many commercially available brake pads have an optimal temperature range that result in a reduced wear rate. FIG. 7 illustrates a comparative spectrum of the rate of carbon wear at different indicated temperatures for three commercially available C-C brake pads from three common manufactures. As shown in the FIG. 7, the relationship between the disc temperature and wear rate of the disc is non-linear and is also different for different brake manufacturers.

In some examples, the threshold temperature limit may be set relatively low (e.g., about 60° C.) to maintain the temperature of brake pads 76 within a pre-programmed temperature range (e.g., less than 150° C. for Brake Pad B in FIG. 7). In some examples, control circuitry 68 may be configured to monitor the change in temperature of the brake pads and adjust a volumetric flow rate of merged gas stream GM, first gas stream G1, and/or second gas stream G2 using one or more of first valve 88 and/or control valve 90 to increase or decrease the supply of cooling gas delivered to brake assembly 41 (e.g., to the brake pads 76) to maintain the temperature of the brake pads and/or a temperature of brake assembly 41 within the pre-programmed temperature range.

In some examples, control circuitry 68 may be configured to supply mixed gas stream GM as a cooling gas to the brake pads while the temperature of brake assembly 41 (e.g., the temperature of the brake pads) are between a first and a second pre-programmed threshold temperature (e.g., between 50° C. and 80° C. for Brake Pad A of FIG. 7). If the brake pads exceed the upper, second pre-programmed threshold temperature, control circuitry 68 may reduce or discontinue the supply of mixed gas stream GM to brake assembly 41 to intentionally allow the brake pads to increase in temperature until they exceed a third pre-programmed threshold temperature (e.g., above 250° C. for Brake Pad A of FIG. 7), at which point control circuitry 68 may continue the supply of mixed gas stream GM to keep the temperature of the brake pads between the third pre-programmed threshold temperature and a fourth pre-programmed threshold temperature (e.g., between about 250° C. and about 350° C. for Brake Pad A of FIG. 7). By intentionally allowing the brake pads to increase in temperature over the range between the second and third threshold values, cooling system 40 may effectively reduce the amount of time that the brake pads operate at the temperatures that cause the maximum wear to occur. In some examples, rather than programming a series of threshold temperature values, the temperatures may be programmed based on one or more range temperatures in which cooling system 40 should supply mixed gas stream GM as a cooling gas or reduce or discontinue the supply of mixed gas stream GM to cool brake assembly 41 (e.g., the brake pads).

The present disclosure includes the following examples.

Example 1: A cooling system, comprising: a first flow path defined by the cooling system and configured to discharge a first gas stream; a second flow path defined by the cooling system and configured to discharge a second gas stream; a flow junction configured to merge the first gas stream and the second gas stream and discharge a mixed gas stream to cool a brake assembly of a vehicle; a pressure sensor configured to provide a pressure signal indicative of a pressure of the first gas stream; a control valve configured to control a flow of the second gas stream; and control circuitry configured to: receive the pressure signal, and operate the control valve to adjust a flow of the second gas stream based on the pressure signal.

Example 2: The cooling system of example 1, wherein the control circuitry is configured to operate the control valve based on the pressure signal such that the first gas stream and the second gas stream each discharge into the flow junction.

Example 3: The cooling system of example 1 or example 2, further comprising: a temperature sensor configured to provide a temperature signal indicative of a temperature of the brake assembly; and a first valve configured to control a flow of the first gas stream, wherein the controller is configured to: receive the temperature signal, and operate the first valve and operate the control valve when the temperature signal is equal to or greater than a threshold.

Example 4: The cooling system of any of examples 1-3, further comprising a first system configured to supply the first gas stream and a second system configured to supply the second gas stream.

Example 5: The cooling system of example 4, wherein the first system is configured to supply a first discharge stream at a first discharge pressure and the second system is configured to supply a second discharge stream at a second discharge pressure greater than the first discharge pressure, wherein the first gas stream is a portion of the first discharge stream and the second gas stream is a portion of the second discharge stream, and wherein the control valve is configured to control the flow of the second gas stream such that a pressure of the second gas stream is less than the second discharge pressure.

Example 6: The cooling system of example 4 or example 5, wherein the first system is a fuel cell.

Example 7: The cooling system of example 6, wherein the fuel cell defines an anode side and a cathode side, and wherein the fuel cell is configured to discharge a cathode exhaust from the cathode side, and wherein the first stream is a portion of the cathode exhaust.

Example 8: The cooling system of example 7, wherein the control circuitry is configured to operate the first valve of example 3 to adjust a flow rate of the first gas stream based on a pressure of the cathode exhaust.

Example 9: The cooling system of any of examples 6-8, wherein the fuel cell is configured to provide electrical power, and wherein the control circuitry is configured to operate the first valve of example 3 to adjust a flow rate of the first gas stream based on an amount of the electrical power provided by the fuel cell.

Example 10: The cooling system of any of examples 4-9, wherein the second system is an environmental conditioning system configured to supply air to a cabin of an aircraft, and wherein the brake assembly is configured to provide braking for the aircraft.

Example 11: The cooling system of any of examples 4-10, wherein the second system includes a condenser, and wherein the second gas stream is a portion of a secondary fluid of the condenser.

Example 12: The cooling system of any of examples 4-11, wherein the first gas stream is a nitrogen enriched air stream.

Example 13: The cooling system of any of examples 1-12, wherein the flow junction includes: a first inlet configured to receive the first gas stream, a second inlet configured to receive the second gas stream, and an outlet configured to discharge the merged gas stream when the first inlet receives the first gas stream and the second inlet receives the second gas stream.

Example 14: The cooling system of any of examples 1-13, further comprising the brake assembly including a disc stack, wherein the brake assembly is configured to compress the disc stack to provide braking to the vehicle, and wherein the temperature signal of example 3 is indicative of a temperature of one or discs in the disc stack.

Example 15: The cooling system of any of examples 1-14, wherein the control circuitry is configured to: receive the temperature signal of example 3, and operate at least one of the first valve of example 3 or the control valve to establish the temperature signal within a range greater than or equal to a minimum threshold and less than or equal to a maximum threshold, wherein the minimum threshold is indicative of a first temperature and the maximum threshold is indicative of a second temperature greater than the first temperature.

Example 16: The cooling system of any of examples 1-15, further comprising a discharge conduit configured to receive the mixed gas flow from the flow junction and discharge the mixed gas to a wheel well of the vehicle, wherein the brake assembly is configured to position within the wheel well.

Example 17: The cooling system of any of examples 1-16, further comprising: a first conduit configured to define the first flow path, wherein the first conduit is fluidically connected to the flow junction; and a second conduit configured to define the second flow path, wherein the second conduit is fluidically connected to the flow junction, wherein the control circuitry is configured to operate the control valve based on the pressure signal to limit flow of the first gas stream from the first conduit to the second conduit.

Example 18: The cooling system of any of examples 1-17, further comprising a flow resistance device configured to limit flow of the second gas flow from the second conduit of example 17 to the first conduit of example 17.

Example 19: The cooling system of any of examples 1-18, wherein the control circuitry is configured to at least one of: operate the first valve of example 3 to a first valve shut position to fluidically isolate the first gas stream and the flow junction, or operate the control valve to a control valve shut position to fluidically isolate the second gas stream and the flow junction, wherein the flow junction is configured to at least one of discharge the second gas stream to cool the brake assembly when the first valve of example 3 is in the first valve shut position or discharge the first gas stream to cool the brake assembly when the control valve is in the control valve shut position.

Example 20: A cooling system, comprising: a fuel cell configured to provide electrical power to a vehicle; a first conduit defining a first flow path and configured to discharge a first gas stream, wherein the first gas stream is at a least a portion of an exhaust stream discharged by the fuel cell; a second conduit defining a second flow path and configured to discharge a second gas stream; a flow junction configured to receive the first gas stream from the first conduit and receive the second gas stream from the second conduit, wherein the flow junction is configured to merge the first gas stream and the second gas stream and discharge a mixed gas stream to cool a brake assembly of the vehicle; a pressure sensor configured to provide a pressure signal indicative of a pressure of the first gas stream in the first conduit; a control valve configured to control a flow of the second gas stream in the second conduit; and control circuitry configured to: receive the pressure signal, and operate the control valve to adjust a flow of the second gas stream based on the pressure signal.

Example 21: The cooling system of example 20, wherein the second gas stream is at least a portion of a discharge stream discharged by an environmental conditioning system configured to supply air to a cabin of the vehicle.

Example 22: The cooling system of example 20 or example 21, further comprising a discharge conduit configured to receive the mixed gas flow from the flow junction and discharge the mixed gas to a wheel well of the vehicle;

Example 23: A method, comprising: receiving, by the control circuitry, a pressure signal indicative of a pressure of a first gas stream from a pressure sensor; operating, using the control circuitry, a control valve to adjust a flow of a second gas stream based on the pressure signal; merging, using a flow junction, the first gas stream and the second gas stream to produce a mixed gas stream; and discharging, using the flow junction, the mixed gas stream to cool a brake assembly of a vehicle.

Example 24: The method of example 23, further comprising operating the control valve to cause each of the first stream and the second stream to discharge into the flow junction.

Example 25: The method of example 23 or example 24, further comprising: receiving, by the control circuitry, a temperature signal indicative of a temperature of the brake assembly from a temperature sensor; and operating, using the control circuitry, at least one of the control valve or a first valve when the temperature signal is equal to or greater than a threshold, wherein the first valve is configured to control a flow of the first gas stream.

Example 26: The method of any of examples 23-25, further comprising: supplying, using a first system, a first discharge stream at a first discharge pressure, wherein the first gas stream is a portion of the first discharge stream; supplying, using a second system, a second discharge stream at a second discharge pressure greater than the first discharge pressure, wherein the second gas stream is a portion of the second discharge stream; and operating, using the control circuitry, the control valve such that a pressure of the second gas stream is less than the second discharge pressure.

Example 27: The method of any of examples 23-26, further comprising supplying, using a fuel cell, the first gas stream.

Example 28: The method of example 27, wherein supplying, using the fuel cell, the first gas stream includes supplying the first gas stream from a cathode exhaust of the fuel cell, wherein the fuel cell defines an anode side and a cathode side, and wherein the fuel cell is configured to discharge the cathode exhaust from the cathode side.

Example 29: The method of cooling of example 27 or example 28, further comprising operating the first valve of example 25 to control a flow rate of the first gas stream based on at least one of a pressure of the cathode exhaust or an amount of the electrical power provided by the fuel cell.

Example 30: The method of any of examples 23-29, further comprising supplying, using an environmental conditioning system configured to supply air to a cabin of an aircraft, the second gas stream.

Example 31: The method of any of examples 23-30, wherein the first gas stream is a nitrogen enriched air stream.

Example 32: The method of any of examples 23-31, further comprising receiving, by the control circuitry, a temperature signal indicative of a temperature of one or discs in a disc stack of the brake assembly, wherein the brake assembly is configured to compress the disc stack to provide braking to the vehicle.

Example 33: The method of any of examples 23-32, further comprising: receiving, by the control circuitry, a temperature signal indicative of a temperature of the brake assembly; and operating, by the control system, at least one of the control valve or the first valve of example 25 to establish the temperature signal within a range greater than or equal to a minimum threshold and less than or equal to a maximum threshold, wherein the minimum threshold is indicative of a first temperature and the maximum threshold is indicative of a second temperature greater than the first temperature.

Example 34: The method of any of examples 23-33, further comprising: positioning, using the control circuitry, at least one of the first valve of example 25 to a first valve shut position to fluidically isolate the first gas stream and the flow junction, or the control valve to a control valve shut position to fluidically isolate the second gas stream and the flow junction; and discharging, using the flow junction, at least one of the second gas stream to cool the brake assembly when the first valve is in the first valve shut position or the first gas stream to cool the brake assembly when the control valve is in the control valve shut position.

The techniques described in this disclosure, including those attributed to control circuitry 68 and other control circuitry, processing circuitry, sensors, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in any suitable device. Processing circuitry, control circuitry, and sensing circuitry, as well as other processors, controllers, and sensors described herein, may be implemented at least in part as, or include, one or more executable applications, application modules, libraries, classes, methods, objects, routines, subroutines, firmware, and/or embedded code, for example. In addition, analog circuits, components and circuit elements may be employed to construct one, some or all of the control circuitry and sensors, instead of or in addition to the partially or wholly digital hardware and/or software described herein. Accordingly, analog or digital hardware may be employed, or a combination of the two.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

Various examples have been described. These and other examples are within the scope of the following claims.

What is claimed is:

1. A cooling system, comprising:
   a first flow path defined by the cooling system and configured to discharge a first gas stream;
   a second flow path defined by the cooling system and configured to discharge a second gas stream;
   a flow junction configured to merge the first gas stream and the second gas stream and discharge a mixed gas stream to cool a brake assembly of a vehicle;
   a pressure sensor configured to provide a pressure signal indicative of a pressure of the first gas stream;
   a control valve configured to control a flow of the second gas stream; and
   control circuitry configured to:
      receive the pressure signal, and
      operate the control valve to adjust a flow of the second gas stream based on the pressure signal.

2. The cooling system of claim 1, wherein the control circuitry is configured to operate the control valve based on the pressure signal such that the first gas stream and the second gas stream each discharge into the flow junction.

3. The cooling system of claim 1, further comprising:

a temperature sensor configured to provide a temperature signal indicative of a temperature of the brake assembly; and a first valve configured to control a flow of the first gas stream, wherein the control circuitry is configured to:

receive the temperature signal, and operate the first valve and operate the control valve when the temperature signal is equal to or greater than a threshold.

4. The cooling system of claim 3, further comprising a disc stack of the brake assembly, wherein the temperature signal is indicative of a temperature of one or more discs in the disc stack.

5. The cooling system of claim 1, further comprising a first system configured to supply the first gas stream and a second system configured to supply the second gas stream.

6. The cooling system of claim 5, wherein the first system is configured to supply a first discharge stream at a first discharge pressure and the second system is configured to supply a second discharge stream at a second discharge pressure greater than the first discharge pressure, wherein the first gas stream is a portion of the first discharge stream and the second gas stream is a portion of the second discharge stream, and wherein the control valve is configured to control the flow of the second gas stream such that a pressure of the second gas stream is less than the second discharge pressure.

7. The cooling system of claim 5, wherein the second system is an environmental conditioning system configured to supply air to a cabin of an aircraft, and wherein the brake assembly is configured to provide braking for the aircraft.

8. The cooling system of claim 5, wherein the first gas stream is a nitrogen enriched air stream.

9. The cooling system of claim 5, wherein the first system is a fuel cell.

10. The cooling system of claim 9, wherein the fuel cell defines an anode side and a cathode side, and wherein the fuel cell is configured to discharge a cathode exhaust from the cathode side, and wherein the first stream is a portion of the cathode exhaust.

11. The cooling system of claim 9, further comprising a first valve configured to control a flow of the first gas stream, wherein the fuel cell is configured to provide electrical power, and wherein the control circuitry is configured to operate the first valve to adjust a flow rate of the first gas stream based on an amount of the electrical power provided by the fuel cell.

12. The cooling system of claim 1, wherein the control circuitry is configured to:

receive a temperature signal indicative of a temperature of the brake assembly; and operate at least one of a first valve or the control valve to establish the temperature signal within a range greater than or equal to a minimum threshold and less than or equal to a maximum threshold, wherein the first valve is configured to control a flow of the first gas stream, and wherein the minimum threshold is indicative of a first temperature and the maximum threshold is indicative of a second temperature greater than the first temperature.

13. The cooling system of claim 1, further comprising a discharge conduit configured to receive the mixed gas stream from the flow junction and discharge the mixed gas stream to a wheel well of the vehicle, wherein the brake assembly is configured to position within the wheel well.

14. The cooling system of claim 1, further comprising:

a first conduit configured to define the first flow path, wherein the first conduit is fluidically connected to the flow junction; and a second conduit configured to define the second flow path, wherein the second conduit is fluidically connected to the flow junction, wherein the control circuitry is configured to operate the control valve based on the pressure signal to limit flow of the first gas stream from the first conduit to the second conduit.

15. The cooling system of claim 1, wherein the control circuitry is configured to at least one of:

operate a first valve to a first valve shut position to fluidically isolate the first gas stream and the flow junction, wherein the first valve is configured to control a flow of the first gas stream, or operate the control valve to a control valve shut position to fluidically isolate the second gas stream and the flow junction, wherein the flow junction is configured to at least one of discharge the second gas stream to cool the brake assembly when the first valve is in the first valve shut position or discharge the first gas stream to cool the brake assembly when the control valve is in the control valve shut position.

16. A cooling system, comprising:

a fuel cell configured to provide electrical power to a vehicle;

a first conduit defining a first flow path and configured to discharge a first gas stream, wherein the first gas stream is at least a portion of an exhaust stream discharged by the fuel cell;

a second conduit defining a second flow path and configured to discharge a second gas stream;

a flow junction configured to receive the first gas stream from the first conduit and receive the second gas stream from the second conduit, wherein the flow junction is configured to merge the first gas stream and the second gas stream and discharge a mixed gas stream to cool a brake assembly of the vehicle;

a pressure sensor configured to provide a pressure signal indicative of a pressure of the first gas stream in the first conduit;

a control valve configured to control a flow of the second gas stream in the second conduit; and control circuitry configured to:

receive the pressure signal, and operate the control valve to adjust a flow of the second gas stream based on the pressure signal.

17. The cooling system of claim 16, wherein the second gas stream is at least a portion of a discharge stream discharged by an environmental conditioning system configured to supply air to a cabin of the vehicle.

18. The cooling system of claim 16, further comprising a discharge conduit configured to receive the mixed gas stream from the flow junction and discharge the mixed gas stream to a wheel well of the vehicle.

19. A method, comprising:

receiving, by the control circuitry, a pressure signal indicative of a pressure of a first gas stream from a pressure sensor;

operating, using the control circuitry, a control valve to adjust a flow of a second gas stream based on the pressure signal;

merging, using a flow junction, the first gas stream and the second gas stream to produce a mixed gas stream; and discharging, using the flow junction, the mixed gas stream to cool a brake assembly of a vehicle.

20. The method of claim 19, further comprising:

receiving, by the control circuitry, a temperature signal indicative of a temperature of the brake assembly from a temperature sensor; and operating, using the control circuitry, at least one of the control valve or a first valve when the temperature signal is equal to or greater than a threshold, wherein the first valve is configured to control a flow of the first gas stream.

\* \* \* \* \*